US011235399B2

(12) United States Patent
Caglar et al.

(10) Patent No.: US 11,235,399 B2
(45) Date of Patent: Feb. 1, 2022

(54) METAL SNIPS

(71) Applicant: Stanley Black & Decker, Inc., New Britain, CT (US)

(72) Inventors: Tolga Caglar, Avon, CT (US); Thomas A. Pelletier, Wallingford, CT (US); Kevin Costello, Sea Cliff, NY (US)

(73) Assignee: Stanley Black & Decker, Inc., New Britain, CT (US)

( * ) Notice: Subject to any disclaimer, the term of this patent is extended or adjusted under 35 U.S.C. 154(b) by 48 days.

(21) Appl. No.: 15/245,003

(22) Filed: Aug. 23, 2016

(65) Prior Publication Data

US 2018/0056409 A1    Mar. 1, 2018

(51) Int. Cl.
| | | |
|---|---|---|
| *B23D 29/02* | (2006.01) | |
| *B26B 13/12* | (2006.01) | |
| *B26B 13/26* | (2006.01) | |
| *B26B 13/20* | (2006.01) | |
| *B26B 13/16* | (2006.01) | |
| *B25G 3/34* | (2006.01) | |
| *B25G 1/10* | (2006.01) | |
| *B25G 3/26* | (2006.01) | |

(52) U.S. Cl.
CPC .......... *B23D 29/026* (2013.01); *B25G 1/102* (2013.01); *B25G 3/26* (2013.01); *B25G 3/34* (2013.01); *B26B 13/12* (2013.01); *B26B 13/16* (2013.01); *B26B 13/20* (2013.01); *B26B 13/26* (2013.01)

(58) Field of Classification Search
CPC ........ B23D 29/026; B25G 1/102; B25G 3/26; B25G 3/34; B26B 13/12; B26B 13/16; B26B 13/20; B26B 13/26
See application file for complete search history.

(56) References Cited

U.S. PATENT DOCUMENTS

| | | | |
|---|---|---|---|
| 4,268,963 A | | 5/1981 | Harrison |
| 4,341,016 A | | 7/1982 | Harrison et al. |
| 5,058,277 A | * | 10/1991 | Kishimoto .............. B26B 13/26 30/249 |
| 5,426,857 A | | 6/1995 | Linden |
| 7,178,245 B1 | | 2/2007 | Lee |
| 7,204,022 B2 | | 4/2007 | Tsuda |

(Continued)

FOREIGN PATENT DOCUMENTS

FR       2255009 A1     7/1975

OTHER PUBLICATIONS

Extended European Search Report, Application No. 17187345.8-1006, EPO (dated Feb. 6, 2018).
Extended European Search Report dated Jun. 2, 2018.

*Primary Examiner* — Stephen Choi
(74) *Attorney, Agent, or Firm* — Wright IP & International Law; Eric G. Wright

(57) ABSTRACT

Hand tools which have an ergonomic using a palm handle and finger handle designs which achieve mechanical efficiency and ease of use. The ergonomic handle is compatible with the muscle movements of an operator using a hand tool reducing muscle strain and pain. Optionally, the palm and finger handles can have ergonomically designed cushions. In an embodiment, the finger handle can have a finger set which has a forward finger flange, a tail finger flange and a pinky grip. The ergonomic handle can also use a relief washer system to achieve a smooth low frictional resistance cutting stroke.

26 Claims, 18 Drawing Sheets

(56) References Cited

U.S. PATENT DOCUMENTS

| | | |
|---|---|---|
| 7,497,016 B1 | 3/2009 | Wu |
| 8,079,150 B2 | 12/2011 | Huang |
| D691,005 S | 10/2013 | Wu |
| D695,583 S | 12/2013 | Musser |
| 8,713,805 B2 | 5/2014 | Schneider et al. |
| 8,726,523 B2 | 5/2014 | Wang |
| 8,739,415 B2 | 6/2014 | Seber et al. |
| D708,037 S * | 7/2014 | Anderson ............... D8/107 |
| 8,832,945 B2 | 9/2014 | Yang |
| 9,003,667 B2 | 4/2015 | Huang |
| 9,144,201 B2 | 9/2015 | Vanttila et al. |
| 2003/0106224 A1 | 6/2003 | Huang |
| 2005/0263544 A1* | 12/2005 | Chang ............... B05C 17/01 |
| | | 222/391 |
| 2007/0266568 A1 | 11/2007 | Lin |
| 2008/0155835 A1 | 7/2008 | Lin |
| 2009/0172954 A1 | 7/2009 | Novak et al. |
| 2010/0293792 A1 | 11/2010 | Ishida |
| 2011/0131814 A1 | 6/2011 | Musser |
| 2011/0192035 A1 | 8/2011 | Chen |
| 2012/0023756 A1 | 2/2012 | Schneider et al. |
| 2013/0091713 A1 | 4/2013 | Wu |
| 2013/0145628 A1 | 6/2013 | Schneider |
| 2014/0182142 A1 | 7/2014 | Vanttila et al. |
| 2014/0360024 A1 | 12/2014 | Schneider |
| 2016/0185000 A1 | 6/2016 | Huang |
| 2017/0332558 A1* | 11/2017 | Dechant ............... A01G 3/021 |

\* cited by examiner

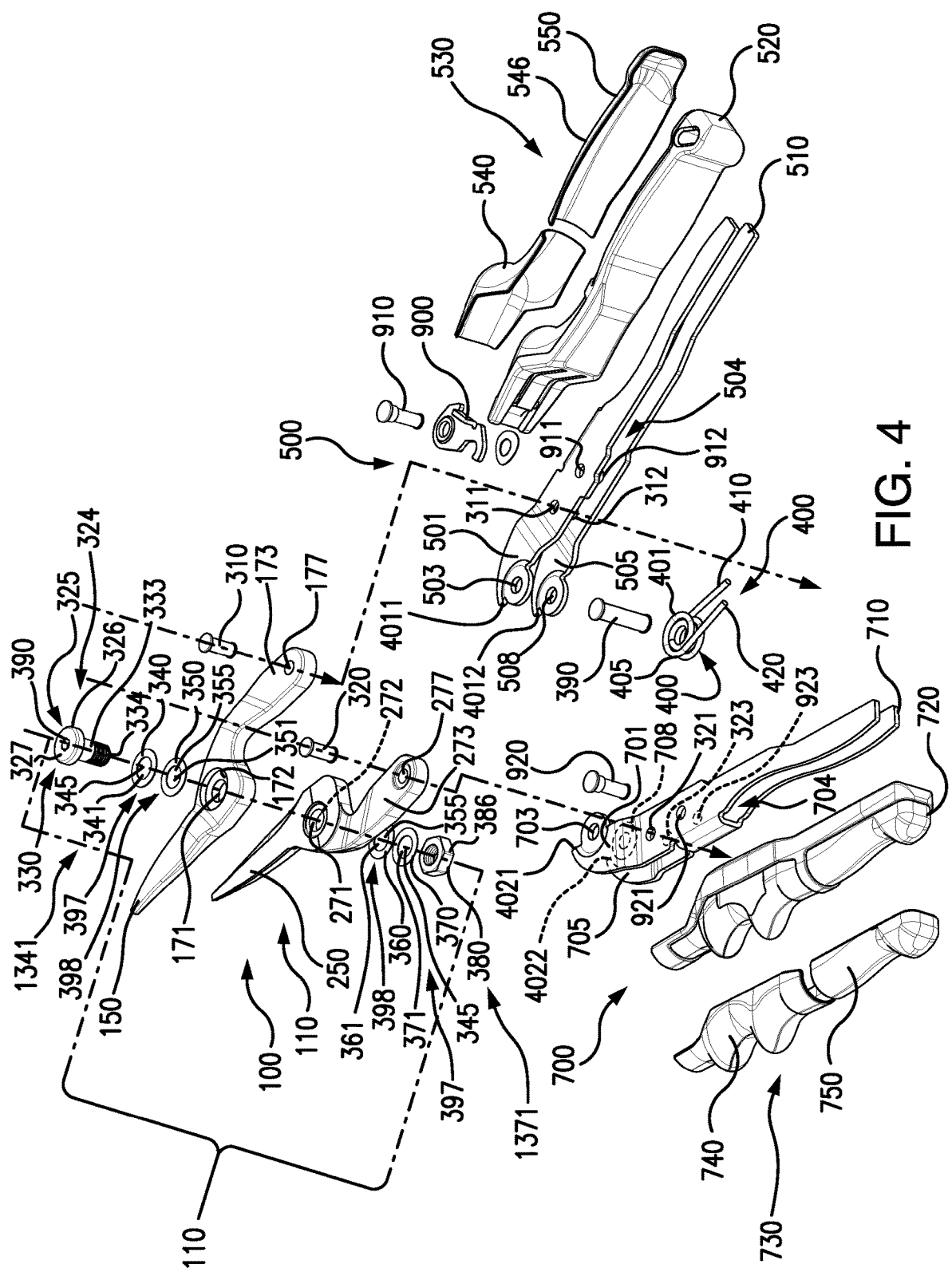

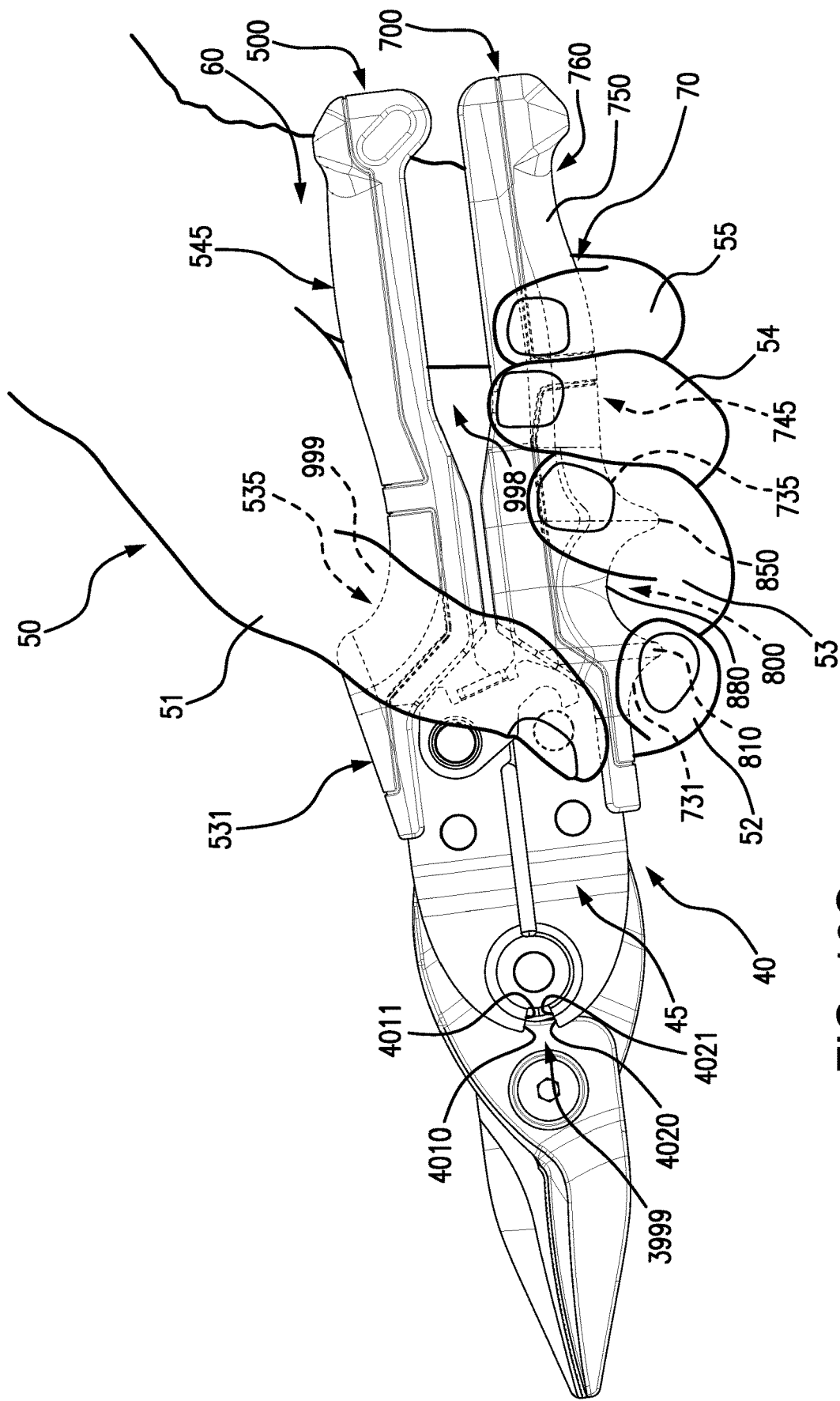

METAL SNIPS

FIELD

This disclosure regards metal snips.

BACKGROUND

Metal snips and snips-type hand tools for cutting metal and other materials are difficult for an operator to use. Traditional metal snips can require excessive exertion by the hand of an operator and can result in muscle fatigue of the hand and arm, be physically tiring and even can be painful to grip and squeeze after using for a required duration. Additionally, because of these failures, at times an operator can decide to misuse snips-type hand tools in various manners seeking to alleviate these deficiencies. There is a strong need for improved metal snips.

SUMMARY

As shown in FIG. 1, in an embodiment, a metal snips 1 can have a handle 25, which can be an ergonomic handle, for a hand tool can have a palm handle 500 pivotally connected to a finger handle 700. The palm handle 500 can be pivotally connected to at least a first portion of a nosepiece 100 and at least a second portion of the nosepiece 100. The finger handle 700 can also have a finger set which can have a forward finger flange 810 and a tail finger flange 850. The handle can have a closed state (e.g. FIG. 1) and an open state (e.g. FIG. 2). The hand tool 25 using the technology disclosed herein can be any of a broad variety of tools, such as, but not limited, to a metal cutter, a metal snips and/or an aviation snips.

In an embodiment, a handle 25 for a hand tool can have a palm handle 500 pivotally connected to a finger handle 700. The palm handle 500 can be adapted to pivotally connect to at least a first portion of a nosepiece 100 of the hand tool. The hand tool can also have a finger handle 700 which can have a finger set 800 which can have a forward finger flange 810 and a tail finger flange 850. The finger handle 700 can pivotally connect to at least a second portion of the nosepiece 100. The handle can have a closed state and an open state.

In an embodiment, the forward finger flange 810 can have a forward finger flange peak 812 and the tail finger flange 850 can have a tail finger flange peak 852, the forward finger flange peak 812 can be configured at a finger set width 2130 from the tail finger flange peak 852. The forward finger flange 810 can have a forward finger flange height 7100 and the tail finger flange 850 can have a tail finger flange height 7111 different from the forward finger flange height 7100. Optionally, the forward finger flange 810 can have a forward finger flange height 7100 and the tail finger flange 850 can have a tail finger flange height 7111 which can be the same as the forward finger flange height 7100.

In an embodiment, the handle 25 can have a purlicue grip 535 having a purlicue peak 545 in which the finger set 800 is configured such that the purlicue peak 545 can have a purlicue peak projection 5110 which can project between the forward finger flange 810 and the tail finger flange 850 when the handle is in a closed state (FIG. 1) and when the handle is in an open state (FIG. 2). The finger handle 700 can have an extended finger grip. The finger handle 700 can have a pinky grip.

Optionally, the front blade 150 can be pivotally connected to the back blade 250 by a blade pivot 325 which passes through at least a relief washer opening 345 and an adjacent blade washer opening 355.

In an embodiment, the handle 25 can have a first portion of a nosepiece 100 which can have a first cutting member pivotally connected to the palm handle 500 and a second portion of the nosepiece 100 which can have a second cutting member pivotally connected to the finger handle 700. The first portion of a nosepiece 100 can have a first gripping member pivotally connected to the palm handle 500 and the second portion of the nosepiece 100 can have a second gripping member pivotally connected to the finger handle 700. The handle can have a span angle measured between a portion of the palm handle 500 and a portion of the finger handle 700 in range of 15° to 35°.

In an embodiment, a hand tool, can have a front blade 150 pivotally connected to a back blade 250. The front blade 150 can be connected to a palm handle 500. The back blade 250 can be connected to a finger handle 700. The finger handle 700 can have a first finger flange at a distance from a second finger flange.

The finger handle 700 can have a finger set 800 having a finger trough positioned at a location between the first finger flange and the second finger flange. The hand tool can also have an extended finger grip adjacent to the first finger flange. For non-limiting example, the finger handle 700 can have an extended finger grip which can extend from adjacent to the first finger flange to a position proximate to a portion of a front blade tail.

In an embodiment, the hand tool can have a palm handle 500 which has a purlicue grip 535 having a portion having a partial torus shape. The palm handle 500 can also have a palm handle chamfer 9001 and the finger handle 700 can have a finger handle chamfer 9101.

Optionally, the hand tool can have the front blade 150 pivotally connected to the back blade 250 by a blade pivot 325 which passes through at least a relief washer opening and an adjacent blade washer opening.

In an embodiment, the finger handle 700 can have a pinky grip that optionally can have a pinky dip.

In an embodiment, the hand tool can have a span notch having a span notch angle in a range of 10° and 75°. In another aspect, the hand tool can have a span notch having a span notch angle in a range of 15° to 60°.

In non-limiting example, the hand tool can be one or more of a metal cutter, a metal snips, an aviation snips, pliers, a wrench, a gripping device, a crimping device and a cutting device. The hand tool can produce a cutting and/or gripping force in which a gripping force applied to a portion of the palm handle 500 and a portion of the finger handle 700 is force multiplied by a leverage ratio of 9.9 to 20 at a portion of the nosepiece 100, such as at a portion of a cutting blade or gripping member. In an embodiment, the hand tool can have a gripping force in a range of 0.5 kgf to 20 kgf applied to a portion of the palm handle 500 and a portion of the finger handle 700 results in a cutting force in a range of 50 kgf to 205 kgf imparted onto a workpiece by at least one of the front blade cutting edge 165 and back blade cutting edge 265. In an embodiment, the hand tool can have a gripping force in a range of 0.5 kgf to 20 kgf applied to at least one of a portion of palm handle 500 and a portion of the finger handle 700 which results in a cutting force in a range of 50 kgf to 205 kgf imparted onto a workpiece by at least one of the front blade cutting edge 165 and back blade cutting edge 265.

In an embodiment, a hand tool handle can have a front working member pivotally connected to a back working member. The front working member can be pivotally connected to a first handle. The back working member can be pivotally connected to a second handle. The finger handle 700 can have a finger set 800 having a forward finger flange 810 and a tail finger flange 850. Front and back working members can be a variety of members respectively to achieve a wide variety of hand tools such as a metal cutter, a metal snips, an aviation snips, pliers, a wrench, a gripping device, a crimping device, and a cutting device.

The forward finger flange 810 can have a forward finger flange peak 812 (FIG. 2) and the tail finger flange 850 can have a tail finger flange peak 852. The forward finger flange peak 812 and the tail finger flange peak 852 can be configured at a finger set width 2130 (FIG. 8A).

The forward finger flange 810 can have a forward finger flange peak 812 and the tail finger flange 850 can have a tail finger flange peak 852. The forward finger flange peak 812 and the tail finger flange peak 852 can be configured to achieve a finger set width 2130 of 8 mm, 10 mm, 20 mm, 30 mm, 50 mm, or greater. The finger set 800 can have a finger set trough height (FIG. 8B) which can be the same height or different heights, e.g. forward finger flange peak to trough height 7235, or tail finger flange peak to trough height 7225.

The forward finger flange 810 can have a forward finger flange height 7100 (FIG. 8B) and the tail finger flange 850 can have a tail finger flange height 7110 different from the forward finger flange height 7100. Optionally, the forward finger flange 810 can have a forward finger flange height 7100 and the tail finger flange 850 can have a tail finger flange height 7110 which is the same as the forward finger flange height 7100. In the embodiment of FIG. 8B, the tail finger flange height 7110 can be the same as the finger handle height 7000.

The finger set can have finger set trough height of 5 mm, 10 mm, 15 mm, or greater. The finger set can have a forward finger flange peak to trough height 7235 of 5 mm, 10 mm, 15 mm, or greater. The finger set can have a tail finger flange peak to trough height 7225 of 5 mm or greater.

The handle can also have a purlicue grip 535 (e.g. FIG. 1, FIG. 8C). The purlicue grip 535 can have a purlicue peak 545 and a purlicue base 529 (FIG. 1). The purlicue grip 535 can have a purlicue peak 545 and a purlicue base 529, the purlicue peak 545 which can have a purlicue peak height 5100 at a distance from a purlicue base 529 (FIG. 8B). The purlicue grip 535 can have a purlicue peak 545 and a purlicue base 529, which can have a purlicue peak height 5100 which is 17 mm or less. The purlicue grip 535 can have a purlicue peak 545 and a purlicue base 529, which can have a purlicue base height 5200 which can be in a range of 50 mm to 5 mm, such as 40 mm, 21 mm, 15 mm, or less.

The purlicue grip 535 and the finger set can be configured such that the purlicue peak 545 can have a purlicue peak projection 5110 which is between a forward finger flange 810 and a tail finger flange 850 when the handle is in a closed state (e.g. FIGS. 1 and 8B) and or in an open state (FIG. 2). The purlicue grip 535 and the finger set can be configured such that the purlicue peak can have a purlicue peak projection 5110 which is between a forward finger flange 810 and a tail finger flange 850 when the handle is in a closed state and when the handle is in an open state. The purlicue grip 535 and the finger set can be configured such that the purlicue peak can have a purlicue peak projection 5110 is in a range of 30 mm to 3 mm, such as 15 mm, 10 mm, or less, of the forward finger flange peak 812 between a forward finger flange 810 and a tail finger flange 850 when the handle is in an open state The purlicue grip 535 and the finger set can be configured such that the purlicue peak 545 can have a purlicue peak projection 5110 is within 15 mm of the forward finger flange peak 812 between a forward finger flange 810 and a tail finger flange 850 when the handle is in an closed state and when the handle is in an open state.

In an embodiment, the palm handle 500 can have a purlicue having a portion which is a purlicue concave arc 5150 (FIG. 2) having a concave arc angle 5155 with a purlicue arc centerpoint 5160. In an embodiment, the purlicue projection 5159 from the purlicue arc centerpoint 5160 can pass through a finger trough, or in a range of 1 mm to 20 mm, e.g. 10 mm, of low point 881 when the metal snips 1 are in an open configuration.

The palm handle 500 is pivotally connected to a finger handle 700 by a handle pivot 390 which is a member of a compound hinge 300 also comprising a blade pivot 325.

The first portion of a nosepiece 100 can have a first cutting member and the second portion of the nosepiece 100 can have a second cutting member. The first portion of a nosepiece 100 can have a first blade member and the second portion of the nosepiece 100 can have a second blade member. The first portion of a nosepiece 100 can have a first gripping member and the second portion of the nosepiece 100 can have a second gripping member. The first portion of a nosepiece 100 can comprise a first jaw member and the second portion of the nosepiece 100 can comprise a second jaw member The finger handle 700 can have a pinky grip 760. The finger handle 700 can have a pinky grip 760 which can have a pinky dip 759. The palm handle 500 can have an extended palm grip 531. The finger handle 700 can have an extended finger grip 731.

In an embodiment, a hand tool can have a handle 25, which can be an ergonomic handle, can have a front working member pivotally connected to a back working member. The front working member can be pivotally connected to a first handle, and the back working member can be pivotally connected to a second handle. The first handle can be a palm handle 500 and the second handle can be a finger handle 700. The handle 25 can have a finger handle 700 which can have a finger set 800 which can have a forward finger flange 810 and a tail finger flange 850.

In an embodiment, a hand tool can have a front blade 150 pivotally connected to a back blade 250. The front blade 150 can be connected to a palm handle 500, and the back blade 250 can be connected to a finger handle 700. The finger handle 700 can have a finger set 800. The finger set 800 can have a first finger flange, such as a forward finger flange 810, and a second finger flange, such as a tail finger flange 850. The palm handle 500 and the finger handle 700 can have an open configuration and a closed configuration.

The palm handle 500 and the finger handle 700 can be pivotally connected by a handle pivot. The hand tool can also have a compound hinge which can have a blade pivot and a handle pivot. The blade pivot 325 can pivotally connect the front blade and the back blade. The handle pivot 390 can pivotally connect the palm handle 500 and the finger handle 700.

The finger handle 700 can have a finger set which can have a finger trough 880 positioned at a location between the first finger flange and the second finger flange. The finger handle 700 can have a finger set which can have a finger set width 2130 in a range of 18 mm to 35 mm. The forward finger flange 810 can have an extended finger flange radius

4925 (FIG. 12A) in a range of 6 mm to 20 mm. The finger set 800 can have finger set radius 4915 in a range of 6 mm to 30 mm. The tail finger flange 850 can have a tail finger flange radius 4919 in a range of 6 mm to 40 mm.

The palm handle 500 can have an extended palm grip 531. The palm handle 500 can have a purlicue grip 535 which can have a purlicue peak 545 and an extended palm grip 531. The extended palm grip 531 can extend along at least a portion of the palm handle length between the purlicue peak 545 and a handle hinge which pivotally connects the palm handle 500 and the finger handle 700.

The extended palm grip 531 can extend along a substantial portion of the finger handle nose 712 (FIG. 3A). The extended palm grip 531 can extend to a position proximate to a portion of a front blade tail 173 (FIG. 4). The extended palm grip 531 can extend to a position proximate to a palm handle rivet 310. The extended palm grip can 531 extend to a position proximate to an extended grip plane 8000 (FIG. 6), which can pass through a handle rivet centerline plane 8110. The extended finger grip 731 can extend to a position proximate to a portion of a back blade tail 273 (FIG. 4). The extended finger grip 731 can extend to a position proximate to a finger handle rivet 320. The extended finger grip can 731 extend to a position proximate to an extended grip plane 8000, which can pass through a handle rivet centerline plane 8110.

The palm handle 500 can have a purlicue grip 535 which can have a purlicue which can have a partial torus shape with a torus diameter of 10 mm to 100 mm, e.g. 50 mm.

The finger grip 745 can extend along a substantial portion of the finger handle nose 712. The finger handle 700 can have an extended finger grip 731 which can extend along a substantial portion of the finger handle nose 712 (FIG. 3A).

The finger handle 700 can have a purlicue grip 535 which can have a purlicue peak and an extended finger grip 731. The extended palm grip 531 can extend along at least a portion of the palm handle length between the purlicue peak 545 and a handle hinge which can pivotally connect the palm handle 500 and the finger handle 700.

The finger handle 700 can have an extended finger grip 731 which can extend to a position proximate to a portion of a rear blade tail 273. The finger handle 700 can have an extended finger grip 731 which can extend to a position proximate to a finger handle rivet. The finger handle 700 can have an extended finger grip 731 which can extend to a position proximate to a handle rivet centerline plane 8110.

Optionally, the finger handle 700 can have a pinky grip 760. The pinky grip 760 can have a pinky dip 759.

The hand tool can also have a span notch 3999 (FIG. 8A) which can have a span notch angle 4000 measured between a palm handle stop, such as a palm handle front plate stop 4011 and a finger handle stop, such as a finger handle front plate stop 4021. The span notch 3999 can have a span notch angle 4000 in a range of 15° and 60° measured between a palm handle stop and a finger handle stop. In an embodiment, the span notch 3999 can have a span notch angle 4000 (FIG. 8A) measured between a palm handle stop face 4015 (FIG. 10B) and a finger handle stop face 4025 (FIG. 10B). The span notch 3999 can have a span notch angle 4000 in a range of 15° and 60° measured between a palm handle stop face 4015 and a finger handle stop face 4025. In the open configuration, the handle 25 can also have a span angle 4990 (FIG. 12A) in a range of 10° to 180°, such as 15°, 45°, 60°, 80°, 120° and 160°, measured between at least a portion of the palm handle plateau 580 (FIG. 2) and the finger handle plateau 780.

In an embodiment, a hand tool can have a front blade 150 pivotally connected to a back blade 250. The front blade 150 connected to a palm handle 500 and the back blade 250 connected to a finger handle 700. The palm handle 500 and the finger handle 700 pivotally connected by a compound hinge 300. The palm handle 500 which can have a palm handle plateau 580 and the finger handle 700 which can have a finger handle plateau 780. The hand tool can have a closed configuration (FIG. 1) and an open configuration (FIG. 2). When the hand tool is in the closed configuration the palm handle plateau 580 can be proximate to the finger handle plateau 780. When the hand tool is in the closed configuration at least a portion of the palm handle plateau 580 can be positioned 1.5 mm or greater from at least a portion of the finger handle plateau 780. When the hand tool is in the closed configuration can have a plateau gap 4500 (FIG. 8A) of 35 mm or less.

The palm handle 500 can have at least first handle plateau which can be proximate to a handle chamfer. In an embodiment, the hand tool can have the palm handle plateau 580 proximate to a palm handle chamfer 9001 (FIG. 3B). The palm handle chamfer angle 9000 can be in a range of 0° to 90° degrees. The finger handle 700 can have at least first handle plateau which can be proximate to a handle chamfer 9900. In an embodiment, the hand tool can also have the finger handle plateau 780 proximate to a finger handle chamfer 9101. The finger handle chamfer angle 9100 can be in a range of 0° to 90° degrees.

The palm handle 500 can have a palm handle grip width and the finger handle 700 can have a finger handle grip width which is smaller than the palm handle grip width. The palm handle 500 can have a palm handle grip width and the finger handle 700 can have a finger handle grip width, the palm handle grip width and the finger handle width which can have a ratio of 3:1 to 5:4.

At least one of the front blade and the back blade can have an origin angle of 110° to 170°, such as front blade origin angle 169 and back blade origin angle 269 (FIGS. 11A and 11B). In an embodiment, a hand tool can have a front blade 150 pivotally connected to a back blade 250. The front blade can be connected to a palm handle 500 and the back blade can be connected to a finger handle 700. The palm handle 500 and the finger handle 700 can be pivotally connected by a compound hinge 300.

In an embodiment, a hand tool can have a nosepiece 100 which can have a front working member pivotally connected to a back working member. The front working member can have a front pivot opening 171 (FIG. 4) which can have a front opening face 172 and adapted for passage of a working members pivot which can have a front head, such as a blade pivot bolt head 327. The back working member can have a back pivot opening 271 which can have a back opening face 272 and adapted for passage of the working members pivot, such as the blade pivot 325, which can have the back head, such as a blade pivot back head 386. The front working member and back working member can be connected by a pivotal connection which can have a relief washer system which can have a relief washer 397, such as front relief washer 340 adjacent to a member washer, such as a front blade washer 350.

The relief washer system can be a front relief washer system 1341 (FIG. 4). The relief washer and the member washer can be configured between the front head and the front opening face 172. The relief washer system can be a back relief washer system 1371. The relief washer and the member washer can be configured between the back head and the back opening face 272. The relief washer system can have a front relief washer system 1341 and a back relief washer system 1371. In an embodiment, the front relief washer system 1341 can have a front relief washer adjacent to a front member washer configured between the front head and the front opening face 172, and the back relief washer system 1371 can have a back relief washer adjacent to a back member washer configured between the back head and the back opening face 272.

In an embodiment, a hand tool, can have a front blade 150 which can have a front pivot opening 171 which can have a front opening face 172 and which can be adapted for passage of a blade pivot member 325 which can have a blade pivot front head 326, as well as a back blade 250 which can have a back pivot opening 271 which can have a front opening face 272 and which can be adapted for passage of a blade pivot member which can have a blade pivot back head 386. The front blade 150 and back blade 250 can be connected by a pivotal connection which can have a front relief washer 340 and a front blade washer 350 configured between the front opening face 272 and the blade pivot front head 326. The blade pivot front head 326 can be the head of a bolt or a nut screwed onto a bolt. The blade pivot front head 326 can be the head of a rivet.

The front blade washer 350 and the front relief washer 340 can be at least in part in frictional contact with one another. The front relief washer 340 and the blade pivot front head 326 can be at least in part in frictional contact with one another. The front blade washer 350 and the front opening face 272 can be at least in part in frictional contact with one another.

The back relief washer 370 and a back blade washer 360 can be configured between the back opening face 272 and the blade pivot back head 386. The blade pivot back head 386 can be the head of a bolt or a nut screwed onto a bolt. The blade pivot front head can be the head of a rivet. The back relief washer 370 and the back blade washer 360 can be at least in part in frictional contact with one another. The back relief washer 370 and the blade pivot back head 386 can be at least in part in frictional contact with one another. The back blade washer 360 and the back opening face 272 can be at least in part in frictional contact with one another.

BRIEF DESCRIPTION OF THE DRAWINGS

The present technology in its several aspects and embodiments solves the problems discussed above and significantly advances the technology of metal snips. The present technology can become more fully understood from the detailed description and the accompanying drawings, wherein:

FIG. 4 shows an exploded view of the metal snips;

FIG. 10C shows a finger-side view of an alternate operator's fingers placement when gripping the metal snips;

Herein, like reference numbers in one figure refer to like reference numbers in another figure.

DETAILED DESCRIPTION

Figure 1:
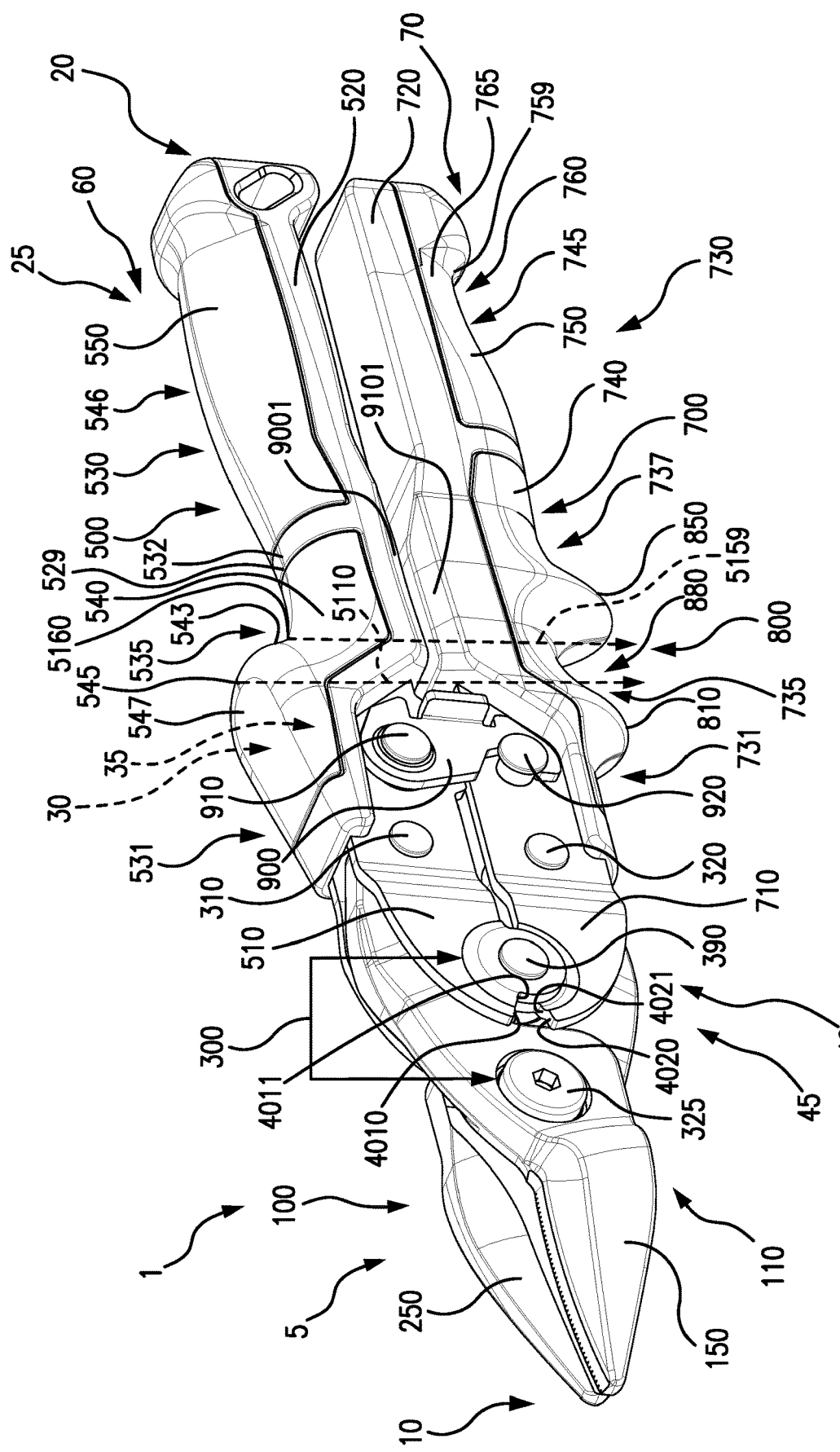
FIG. 1 shows a perspective view of an embodiment of a metal snips in a closed and latched configuration.

Applicant has created a handle 25 for hand tools that can be used to achieve a broad variety of ergonomically designed hand tools not previously possible. The non-limiting example embodiment disclosed in detail herein is a metal snips 1, such as an aviation snips 5. This disclosure relates to the many and varied embodiments of cutters, metal shears, aviation snips, tin snips, scissors, plier, wrenches and other jawed or bladed tools using the technology disclosed herein. The handle 25 disclosed in the various embodiments herein can be used implemented with a number of appropriate hand tools to achieve a level of user comfort and muscle efficiency not previously known.

The handle 25 provides a purlicue grip 535 and a finger set 800 which are configured to relieve unnecessary muscle work and prevent muscle pain and physical discomfort of the user. Additionally, the handle 25 can be configured to have a span angle 4990 which prevents a user from over-extending their hand during use. Further, the handle 25 achieves a design which prevents a user from pinching a portion of their hand between a portion of a palm handle 500 and a portion of a finger handle 700.

The ergonomic hand tools can have cutting, gripping and working nose sections which have achieve ergonomic designs which can be used independently or in conjunction with the handle 25. A non-limiting example of a nosepiece 100 which is a metal snips nosepiece 90 having an ergonomic design is disclosed herein having the handle 25.

FIG. 1 shows a perspective view of a non-limiting embodiment of a metal snips 1 in a closed and latched configuration having a nose end 10 and a tail end 20. The metal snips 1 can have a palm-side 60 and a finger-side 70. The metal snips 1 can also have a front side 40 and a front side face 45, as well as a back side 30 and a back side face 35.

The metal snips 1 can have a nosepiece 100, a compound hinge 300, a palm handle 500 and a finger handle 700. The nosepiece 100 of the metal snips can have a nose end 10, a front blade 150 and a back blade 250 which are connected by a blade pivot 325 of the compound hinge 300. The compound hinge 300 can have two or more pivot members, such as a blade pivot 325 and a handle pivot 390. FIG. 1 shows a blade pivot 325 which can connect the front blade 150 and a back blade 250 to form a blade assembly 110. A handle pivot 390 can connect the palm handle 500 and the finger handle 900.

The palm handle 500 can be connected to a front blade tail 172 of the front blade 150 by a palm handle rivet 310. The palm handle 500 can be formed from a palm handle frame 510, overmolded by a palm handle substrate 520. The palm handle substrate 520 can support a purlicue grip 535, an extended purlicue grip 531 and a palm grip 546. A number of a palm handle cushions 530 can be used with a palm grip 546. In the embodiment of FIG. 1, the purlicue grip 535 can have a purlicue arc centerpoint 5160 and a purlicue cushion 540. The palm grip 545 can have a palm cushion 550.

In an embodiment, the purlicue peak 545 can have a purlicue peak projection 5110 which is between a forward finger flange 810 and a tail finger flange 850 when the handle is in a closed state. The purlicue peak projection 5110 which is between a forward finger flange 810 and a tail finger flange 850 when the handle is in a closed state and when said handle is in an open state. The purlicue peak projection 5110 is within 15 mm of the forward finger flange peak 812 (e.g. FIG. 6) and between a forward finger flange 810 and a tail finger flange 850 when the handle is in an open state. The purlicue peak projection 5110 is within 15 mm of the forward finger flange peak 812 between a forward finger flange 810 and a tail finger flange 850 when the handle is in a closed state and when said handle is in an open state.

The finger handle 700 can be connected to a back blade tail 273 (FIG. 4) of the back blade 250 by a finger handle rivet 320. The finger handle 700 can be formed from a finger handle frame 710, overmolded by a finger handle substrate 720. The finger handle substrate 720 can support an extended finger grip 731, a finger set 800 and a finger grip 745. In an embodiment, a finger trough 880 can be configured between the forward finger flange 810 and the tail finger flange 850. The finger set 800 can also have a finger set grip 735. A number of a finger handle cushions 730 can be used. In the embodiment of FIG. 1, a forward finger cushion 737 and a tail finger cushion 750 are shown. Optionally, as shown in FIG. 1 the finger handle 700 can have a pinky grip 760 which can have a pinky dip 759 and a pinky cushion 765.

Figure 10A:
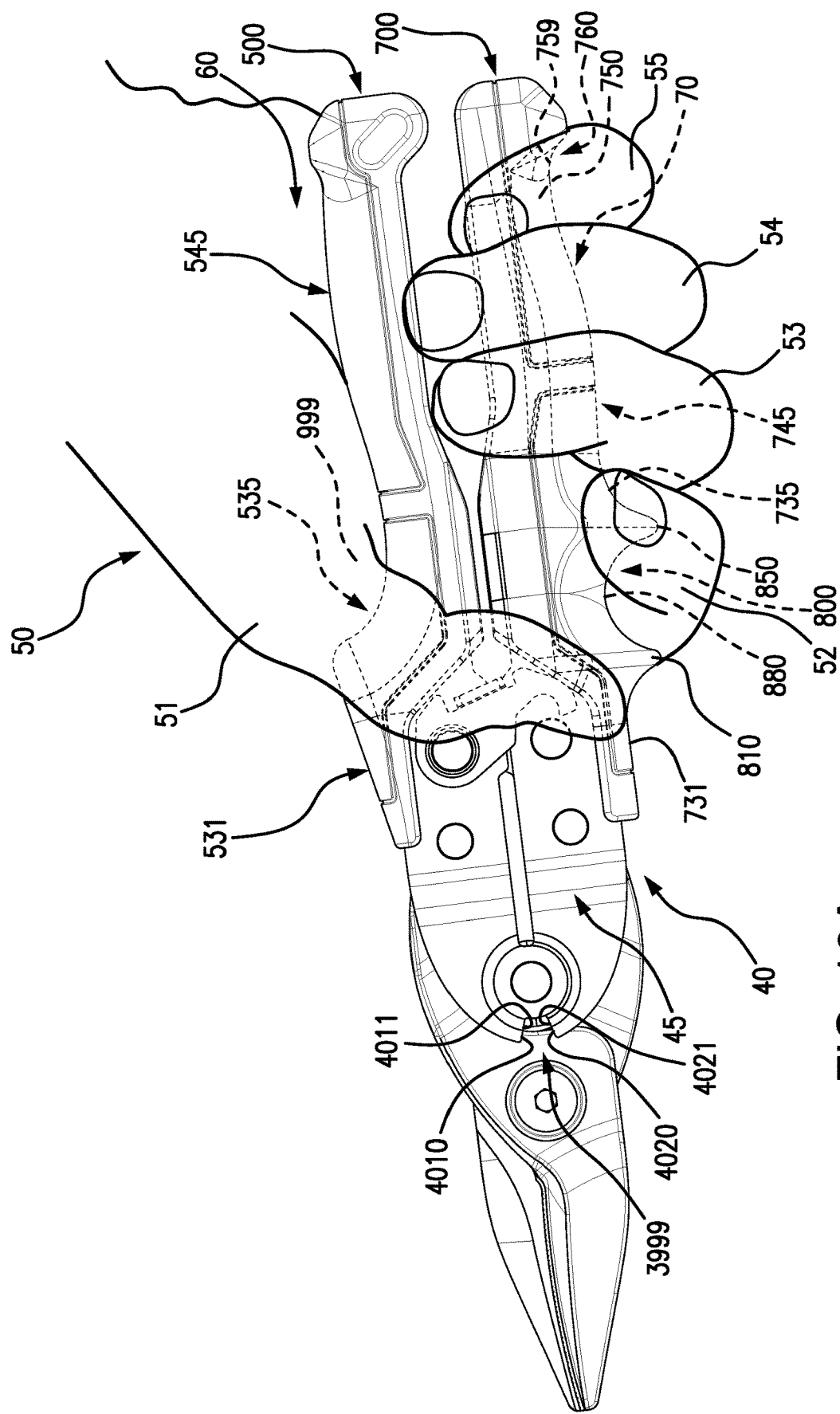
FIG. 10A shows a finger-side view of an operator's fingers placement when gripping the metal snips.
Figure 10B:
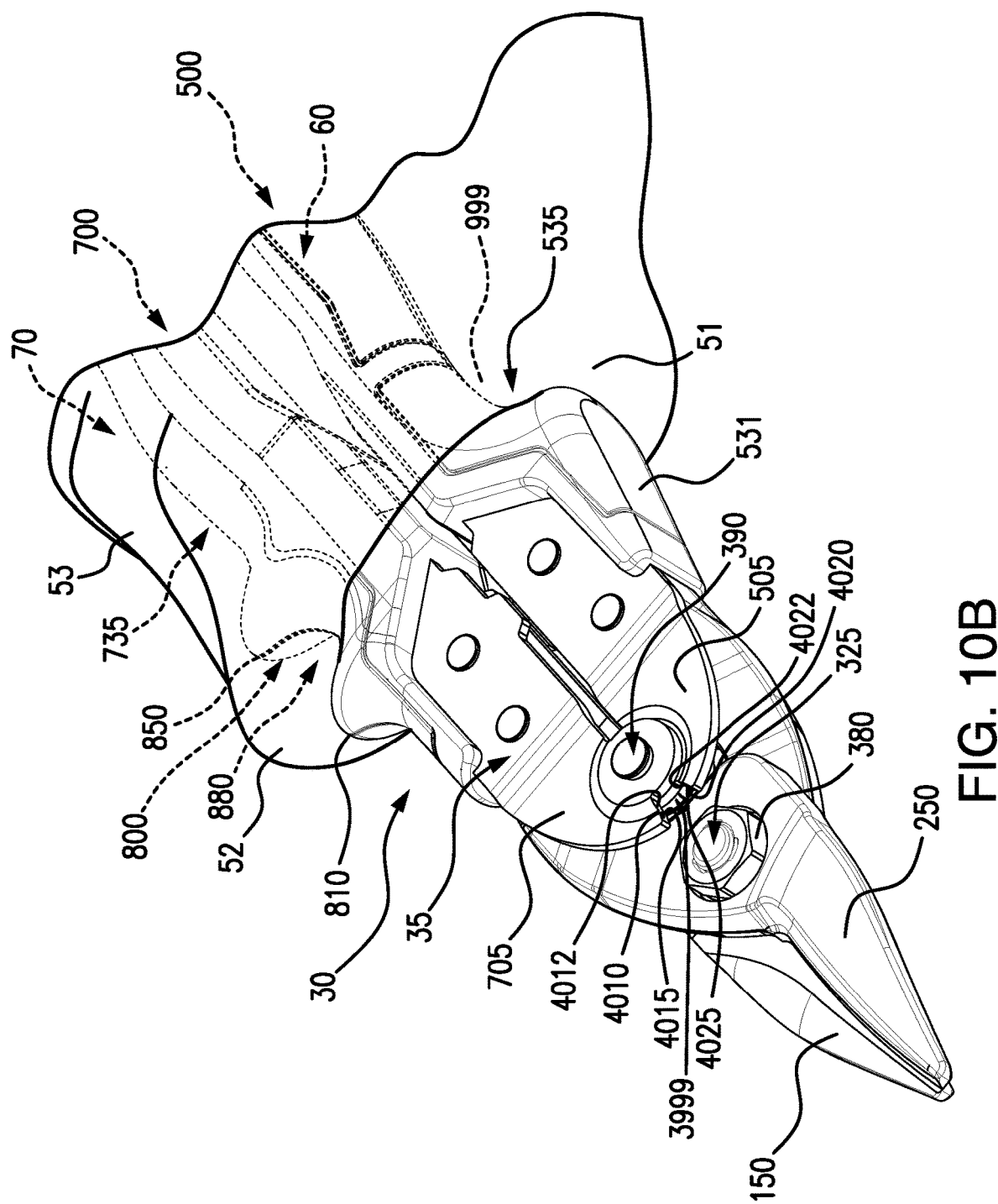
FIG. 10B shows a perspective view of an operator gripping the metal snips.

A palm handle stop 4010 and a finger handle stop 4020 can be configured to form a span notch angle 4000 (FIG. 8A) of from 24° to 36°, such as 30° as measured between a palm handle palm handle stop face 4015 (FIG. 10B) and a finger handle stop face 4025 (FIG. 10B). In an embodiment, the palm handle stop 4010 can in non-limiting example have a palm handle front plate stop 4011 and a finger handle stop 4020 can have as a finger handle front plate stop 4021

Figure 2:
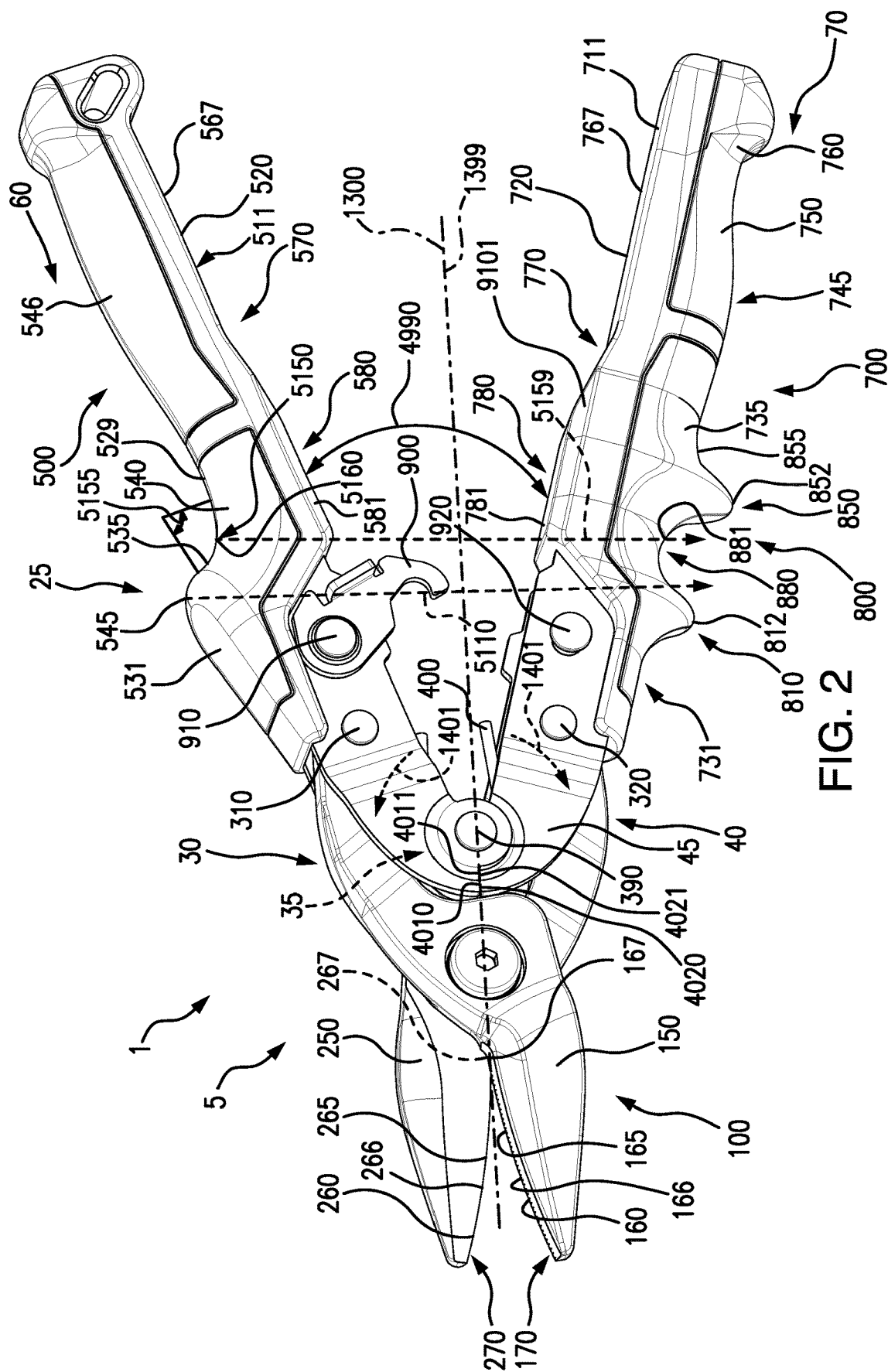
FIG. 2 shows a perspective view of an embodiment of a metal snips in an open and unlatched configuration.

FIG. 1 also shows a latch 900 pivotally connected to the palm handle 500 by a latch hinge 910. In the embodiment of FIG. 1, the latch 900 can be reversibly anchored to a latch anchor 920 to achieve a closed state of the metal snips 1. Releasing the latch 900 from latch anchor 920 can allow the metal snips 1 to achieve an open state as shown in FIG. 2.

FIG. 1 also shows a close up of the purlicue grip 535. FIG. 1 shows a non-limiting embodiment having a purlicue forward grip 547 extending from a purlicue peak 545 along the palm handle 500 toward the compound hinge 300. A purlicue rise 543 is shown between the purlicue peak 545 and palm handle face 532 which can be adjacent to a purlicue base 529. In an embodiment, a purlicue projection 5159 can project to a point within the finger set 800, such as a point on the finger trough 880 or through the finger trough low point 881 (FIG. 2).

The embodiment of FIG. 1 has a palm cushion 550 and an extended palm grip 531 having a purlicue forward grip 547.

The metal snips 1 of FIG. 1 can also have a palm handle 500 which can have one or more of a palm handle chamfer 9001 and can also have a finger handle 700 which can have one or more of a finger handle chamfer 9101. The one or more of a palm handle chamfer 9001 and/or the one or more of a finger handle chamfer 9101 can reduce the likelihood that a user will pinch a portion of the user's hand when gripping the metal snips 1 to achieve a closed state from an open state, or when the metal snips 1 are in a closed state.

FIG. 2 shows a perspective view of an embodiment of a metal snips of FIG. 1 in an open configuration. FIG. 2 shows the front blade 150 having a front blade edge 160 having a front blade cutting edge 165 and a front blade overlapped edge 167. The front blade edge 160 can have a front cutting edge curve 170, with a front cutting edge shape 166.

FIG. 2 also shows the back blade 250 having a back blade edge 260 having a back blade cutting edge 265 and a back blade overlapped edge 267. The back blade edge 260 can have a back cutting edge curve 270, with a back cutting edge shape 266.

FIG. 2 shows spring 400 which can exert an opening bias 1401 respectively on the palm handle 500 and on the finger handle 700 causing the palm handle 500 and on the finger handle 700 to pivot about the handle pivot 390 radially separating the palm handle 500 and on the finger handle 700 to pivot about the handle pivot 390 to achieve an open state of the metal snips 1.

In the embodiment of FIG. 2, the palm handle substrate 520 can have a palm handle plateau 580 having a palm handle plateau face 581 adjacent to a palm handle ramp 570. The palm handle ramp 570 can provide a palm handle plateau height 4.8 mm between the palm handle plateau 580 and a palm handle base 567. The palm handle base 567 can have a palm handle base face 511.

The finger handle substrate 720 can have a finger handle plateau 780 having a finger handle plateau face 781 adjacent to a finger handle ramp 770. The finger handle ramp 770 can provide a finger handle plateau height 5.85 mm between the finger handle plateau 780 and a finger handle base 767. The finger handle base 797 can have a finger handle base face 711.

FIG. 2 also shows a span angle 4990 as measured between the palm handle 500 and the finger handle 700 in a range of 15° to 60°, e.g. 30°. As shown in FIG. 2, in an embodiment the span angle 4990 can be measured between a palm handle plateau face 581 and a finger handle plateau face 781 and can have an angle in a range of 15° to 60°, e.g. 30°.

Figure 12A:
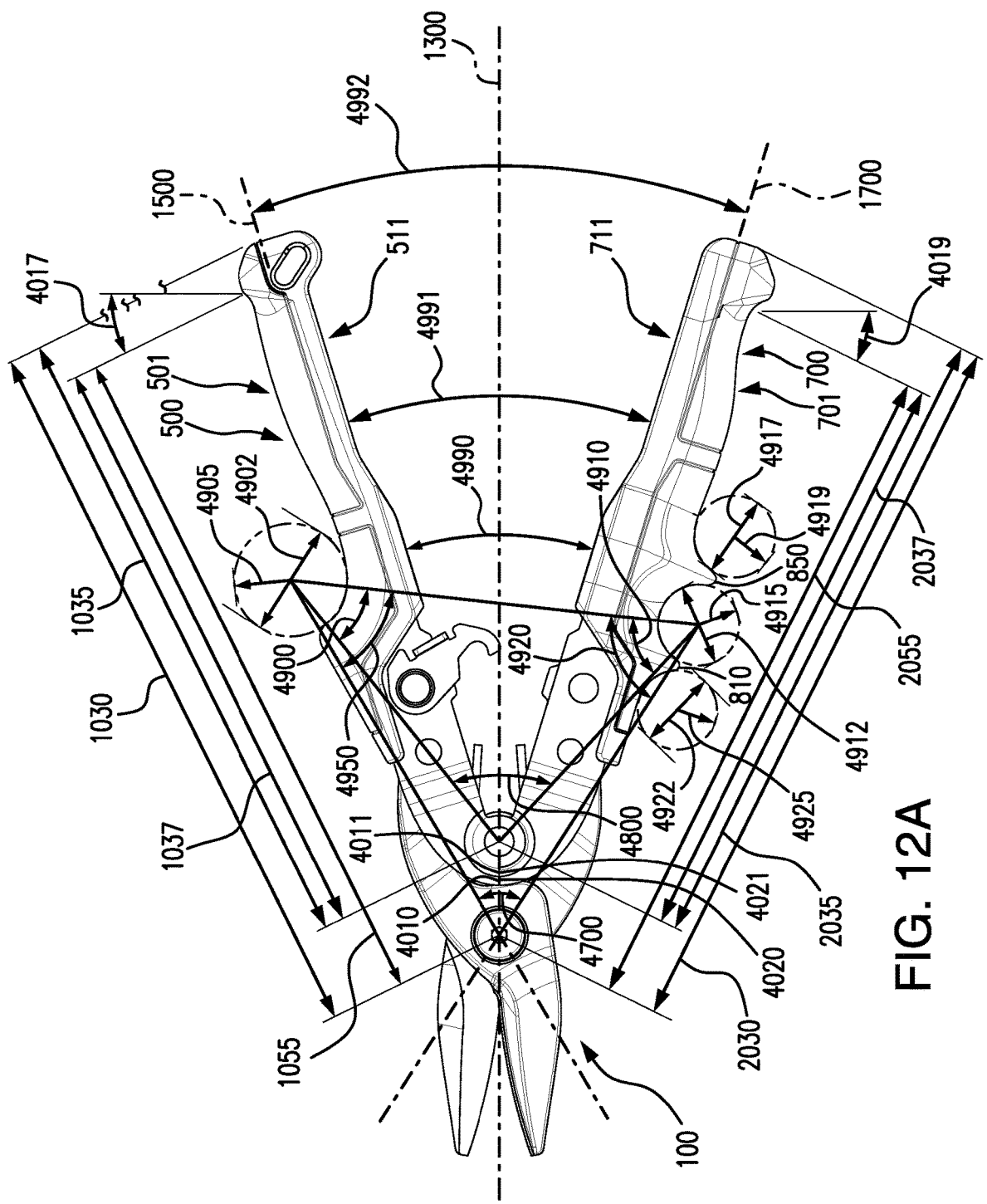
FIG. 12A is a detailed view of the geometry of the compound hinge, purlicue and finger set.

As shown in FIG. 12A, in an embodiment the grip span angle 4991 can be measured from a portion of the palm handle base face 511 to a portion of the finger handle base face 711 and can have an angle in a range of 15° to 60°, e.g. 30°. As also shown in FIG. 12A, in an embodiment the handle centerline span angle 4992 can be measured from a palm handle centerline 1500 to a finger handle centerline 1700 and can have an angle in a range of 15° to 60°, e.g. 30°.

The non-limiting embodiment of the finger set 800 shown in FIG. 2 has a forward finger flange 810 having a forward finger flange peak 812 located between the extended finger grip 731 and the finger trough 880, as well as a tail finger flange 850 having a tail finger flange peak 852 located between the finger trough 880 and a tail finger set grip 855.

FIG. 2 shows a purlicue grip 535 having a portion which has a purlicue concave arc 5150 having a concave arc angle 5155 with the purlicue arc centerpoint 5160. In an embodiment, the purlicue projection 5159 taken normal to handle longitudinal centerline plane 1399 from the purlicue arc centerpoint 5160 can pass through the finger trough low point 881 when the metal snips 1 are in an open configuration. In an embodiment, the purlicue projection 5159 taken normal to handle longitudinal centerline plane 1399 from the purlicue arc centerpoint 5160 can pass through the finger set 880 when the metal snips 1 are in an open configuration. The purlicue peak projection 5110 taken normal to the handle longitudinal centerline plane 1399 from the purlicue peak 545 can pass through the finger set 880 when the metal snips 1 are in an open configuration. Optionally, the compound hinge centerline 1300 can be coplanar to the handle longitudinal centerline plane 1399.

The purlicue concave arc 5150 can have an arc in a range of 0.2 radians to 2.0 radians, e.g. 1 radian. In an embodiment, the purlicue concave arc 5150 can have an arc length in a range of 3 mm to 30 mm, e.g. 17.5 mm. The concave arc length 5155 can be in a range of 0.1 mm to 20 mm, e.g. 7.5 mm.

Figure 3A:
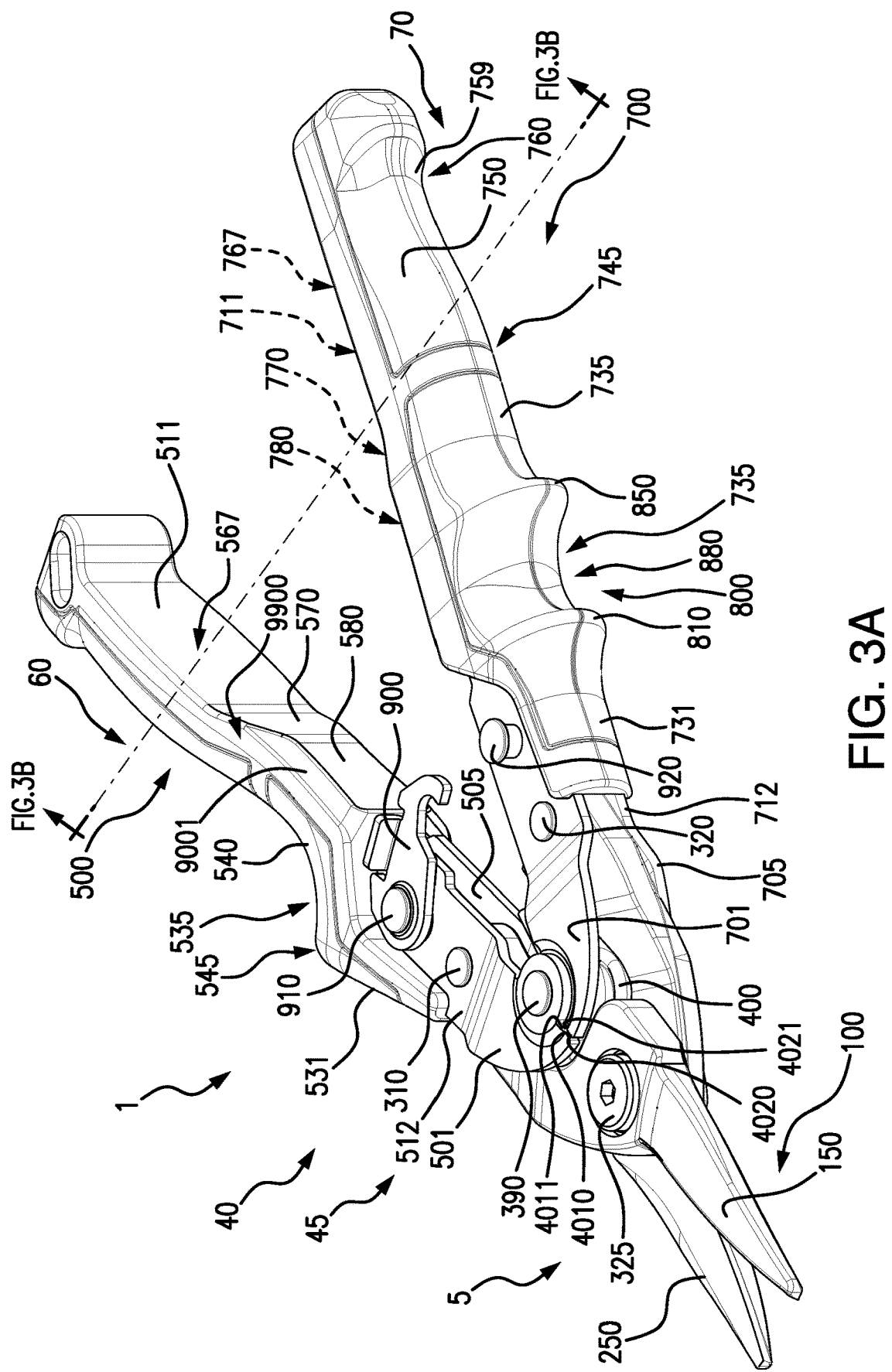
FIG. 3A shows a perspective view of the metal snips showing a detail of the palm handle plateau.

FIG. 3A shows a perspective view of the metal snips showing a detail of the palm handle plateau 580. The perspective of FIG. 3A shows the palm handle plateau 580, as well as a palm handle ramp 570 connecting the palm handle base 567 to the palm handle plateau 580. The perspective of FIG. 3A shows the finger handle plateau 780, as well as a finger handle ramp 770 connecting the finger handle base 767 to the finger handle plateau 780. FIG. 3A calls out FIG. 3B which is a detailed drawing of the one or more of a palm handle chamfer 9001 and the one or more of a finger handle chamfer 9101 (FIG. 3).

Figure 3B:
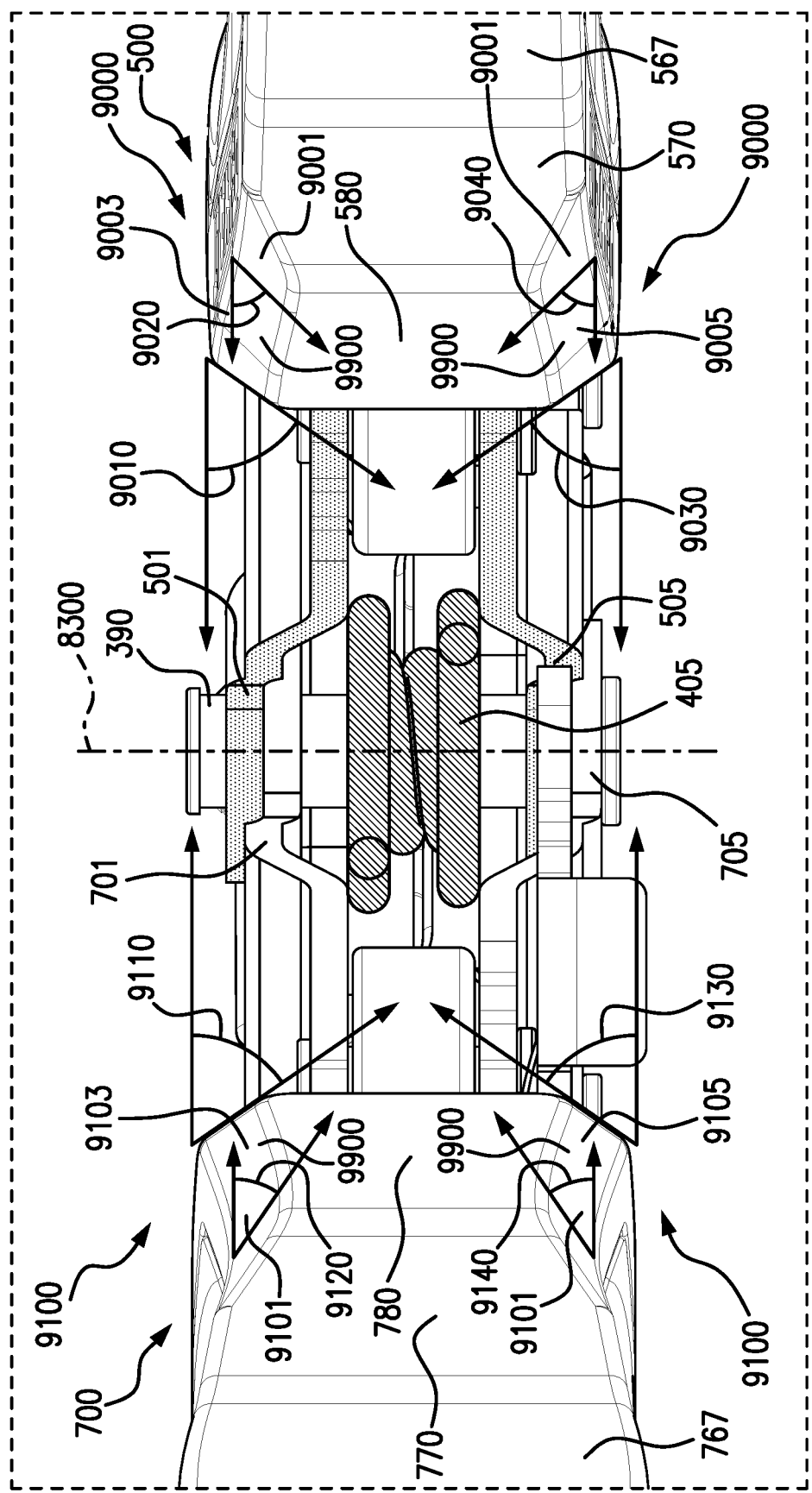
FIG. 3B shows a detailed view of the handle chamfers.

FIG. 3B is a detailed view of the handle chamfers which shows a palm handle 500 having a palm handle front chamfer 9003 and a palm handle back chamfer 9005 and a finger handle 700 having a finger handle front chamfer 9103 and a finger handle back chamfer 9105.

The palm handle can have a palm handle chamfer angle 9000 in a range of 0° to 90°, e.g. 45°. A palm handle front chamfer 9003 can have a front nose palm handle chamfer angle 9010 in a range of 0° to 90°, e.g. 45°, and front tail palm handle chamfer angle 9020 in a range of 0° to 90°, e.g. 45°. A palm handle back chamfer 9005 can have a back nose palm handle chamfer angle 9030 in a range of 0° to 90°, e.g. 45°, and back tail palm handle chamfer angle 9040 in a range of 0° to 90°, e.g. 45°.

The finger handle can have a finger handle chamfer angle 9100 in a range of 0° to 90°, e.g. 45°. A finger handle front chamfer 9103 can have a front nose finger handle chamfer angle 9110 in a range of 0° to 90°, e.g. 45° and a front tail finger handle chamfer angle 9120 in a range of 0° to 90°, e.g. 45°. A finger handle back chamfer 9105 can have a back nose finger handle chamfer angle 9130 in a range of 0° to 90°, e.g. 45° and a back tail finger handle chamfer angle 9140 in a range of 0° to 90°, e.g. 45°.

FIG. 4 shows an exploded view of the metal snips of FIG. 1. The exploded view shows the front blade 150 and back blade 250 of nosepiece 100. The blade pivot mechanism 324 can have a blade pivot 325, which can be a member pivotally connecting the front blade 150 and the back blade 250.

The front blade 150 can have a front pivot opening 171 adapted for the passage of a pivot shaft 333 of blade pivot 325. In the non-limiting embodiment shown in FIG. 4, the blade pivot 325 can have a blade pivot shaft 333 which can pass through the front pivot opening 171 and the back pivot opening 271. The back blade 250 can have a back pivot opening 271 adapted for the passage of a pivot shaft 333 of blade pivot 325. The back blade 250 can have a back blade tail 273 having a back hinge opening 277 adapted for the passage of finger handle rivet 320.

Optionally, a number of washers can be used in a location between the blade pivot front head 326 and the front opening face 172. In the embodiment of FIG. 4, a front relief washer 340 is positioned adjacent to the blade pivot front head 326 and a front blade washer 350 can be adjacent to both the front relief washer 340 and the front opening face 172. As shown in FIG. 4, a pivot member, such as handle pivot 390, can pass through at least one relief washer opening 345, such as front relief washer opening 341, and at least one blade washer opening 355, such as front blade washer opening 351. The handle pivot 390 can also pass through the front pivot opening 171 and the back pivot opening 271. In the embodiment shown in FIG. 4, the handle pivot 390 can also pass through back blade washer opening 361 and back relief washer opening 371. A relief washer system can have at least one of a relief washer 397 adjacent to and/or at least in part in contact with at least one of a blade washer 398. A relief washer system can optionally have a plurality of washers, i.e. 1 . . . n, where n is 2 or more. One or more of the washers of a relief washer system, such as a relief washer 397 and a blade washer 398 can be made from a broad variety of materials such as metal, polymer, plastic, polytetrofluoroethylene, Teflon® (Chemours Company FC, LLC, 1209 Orange Street Wilmington Del. 19801, phone (302) 992-2422), or other material or combination thereof. Optionally, one or more of the washers of a relief washer system, such as a relief washer 397 and a blade washer 398 can be made from a material which is coated with another material, such as a metal washer coated with Teflon®, polytetrofluoroethylene, or other material.

Optionally, a number of washers can be used in a location between the blade pivot back head 386 and the back opening face 272. A back relief washer 370 can be positioned adjacent to the blade pivot back head 386 and a back blade washer 360 can be adjacent to both the back relief washer 370 and the back opening face 272.

While the type of blade pivot 325 is not limited, examples include a fastener, a bolt, a screw, or a rivet. In non-limiting example, FIG. 4 shows a blade pivot bolt 330 having a blade pivot bolt head 327 and a blade pivot bolt shaft 334, which is a non-limiting example of a blade pivot shaft 333. The blade pivot bolt shaft 334 can pass through front relief washer 340, front blade washer 350, front pivot opening 171, back pivot opening 271, back blade washer 360, back relief washer 370, and into blade pivot nut 380 which can be screwed onto the blade pivot bolt shaft 330 to achieve the assembly of the blade assembly 110.

The compound hinge 300 can have two or more pivot members, such as a blade pivot 325 and a handle pivot 390, as shown in the non-limiting embodiment of FIG. 1. FIG. 1 shows a blade pivot 325 which can connect the front blade 150 and a back blade 250 to form a blade assembly 110. A handle pivot 390 can connect the palm handle 500 and the finger handle 900.

As shown in FIG. 4, the palm handle 500 and the finger handle 700 can be connected by a handle pivot 390. The palm handle front plate opening 503 and palm handle back plate opening 508 can be aligned with the finger handle front plate opening 703 and finger handle back plate opening 708. In such aligned configuration, the handle pivot 390 can pass through each of the palm handle front plate opening 503, palm handle back plate opening 508, finger handle front plate opening 703 and finger handle back plate opening 708 to pivotally connect the palm handle 500 and the finger handle 700 together.

The front blade 150 can also have a front blade tail 173 having a front hinge opening 177 adapted for the passage of palm handle rivet 310. The front blade 150 can be connected to the palm handle 500 by a top rivet 310 which can pass through the front hinge opening 177 as well as a front palm handle rivet opening 311 and back palm handle rivet opening 312.

The back blade 250 can be connected to the finger handle 700 by a bottom rivet 320 which can pass through the back hinge opening 277 as well as a front finger handle rivet opening 321 and back finger handle rivet opening 323.

The palm handle 500 can have a palm handle frame 510 which can be overmolded by the palm handle substrate 520. Optionally, the palm handle cushions 530 can be overmolded, or adhered, to the palm handle substrate 520.

The palm handle frame 510 can be formed metal and can have a palm handle front plate 501 with a palm handle front plate opening 503 through which the handle pivot 390 can pass. The palm handle front plate stop 4011 is shown adjacent to the palm handle front plate opening 503. The palm handle frame 510 can also have a palm handle back plate 505 with a palm handle back plate opening 508 through which the handle pivot 390 can pass. The palm handle back plate stop 4012 is shown adjacent to the palm handle back plate opening 508. The palm handle frame 510 can also have a palm handle channel 504 adapted to receive a biasing contact from a palm handle spring arm 410 of spring 400.

The palm handle rivet 310 can pass through the front palm handle rivet opening 311 and back palm handle rivet opening 312. Additionally, the palm handle frame 510 can support the latch 900 having a latch hinge 910 which can pass through a front latch hinge opening 911 and a back latch hinge opening 912.

The palm handle substrate 520 can be supported by the palm handle frame 510 and can support an number of palm handle cushions, such as in non-limiting example the purlicue cushion 540 and the palm cushion 550

The finger handle 700 can have a finger handle frame 710 which can be overmolded by the finger handle substrate 720. Optionally, the finger handle cushions 730 can be overmolded, or adhered, to the finger handle substrate 720.

The finger handle frame 710 can be formed metal and can have a finger handle front plate 701 with a finger handle front plate opening 703 through which the handle pivot 390 can pass. The finger handle front plate stop 4021 is shown adjacent to the finger handle back plate opening 708. The finger handle frame 710 can also have a finger handle back plate 705 with a finger handle back plate opening 708 through which the handle pivot 390 can pass. The finger handle back plate stop 4022 is shown adjacent to the finger handle back plate opening 708.

The finger handle frame 710 can also have a finger handle channel 704 adapted to receive a biasing contact from a finger handle spring arm 420 of spring 400.

The finger handle rivet 320 can pass through the front finger handle rivet opening 321 and back finger handle rivet opening 323. Additionally, the finger handle frame 710 can have a latch hinge 910 which can pass through a front latch hinge opening 921 and a back latch hinge opening 923.

The latch 900 can be pivotally attached optionally to the palm handle by a latch hinge 910 which can pass through the front latch hinge opening 911 and the back latch hinge opening 912. The latch 900 can be reversibly latched to the latch anchor 920 which can pass through the front latch hinge opening 921 and the back latch hinge opening 923.

The finger handle substrate 720 can be supported by the finger handle frame 710 and can support a number of finger handle cushions, such as in non-limiting example the finger set cushion 740 and the tail finger cushion 750.

Optionally, the handle pivot 390 can pass through a spring coil 401 of spring 400 which can be a torsion spring 405.

The torsion spring 405 can have a palm handle spring arm 410 which can fit at least in part within the palm handle channel 504 contacting at least a portion of the palm handle 500 and exerts an opening bias upon at least a portion of the palm handle frame 510.

The torsion spring 405 can have a finger handle spring arm 420 which can fit at least in part within the finger handle channel 704 contacting at least a portion of the finger handle 700 and exerts an opening bias upon at least a portion of the finger handle frame 710.

Numeric values and ranges herein, unless otherwise stated, also are intended to have associated with them a tolerance and to account for variances of design and manufacturing. Thus, a number can and is intended to include values "about" that number, unless otherwise stated. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). The claims are to be broadly construed in their recitations of numbers and ranges.

Figure 5:
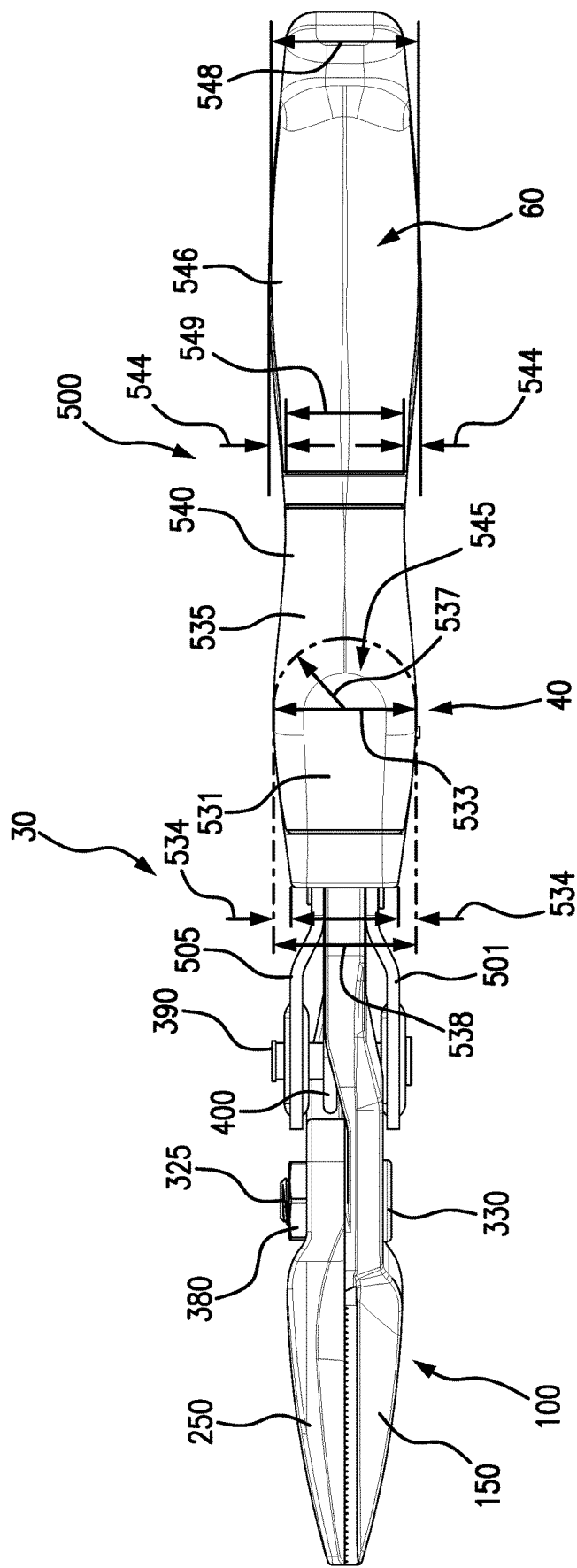
FIG. 5 shows a palm-side view of the metal snips.

FIG. 5 shows a palm-side view of the metal snips of FIG. 1. In the embodiment of FIG. 5, the palm-side view of the extended palm grip 531 shows the expanding width of the extended palm grip 531 between the extended palm grip nose width 538 which can be in a range of 5 mm to 40 mm, e.g. 17.7 mm and the extended palm grip purlicue width 533 which can be in a range of 10 mm to 45 mm, e.g. 23.5 mm, as well as the purlicue peak radius 537 which can be in a range of 5 mm to 35 mm, e.g. 11.5 mm. The extended palm width reduction 534 can be in a range of 1 mm to 40 mm, e.g. 5.8 mm.

FIG. 5 also shows the palm grip width 548 which can be in a range of 5 mm to 50 mm, e.g. 24.5 mm and the palm handle narrow width 549 which can be in a range of 5 mm to 50 mm, e.g. 19.6 mm. The palm grip width reduction 544 can be in a range of 1 mm to 40 mm, e.g. 4.9 mm.

Figure 6:
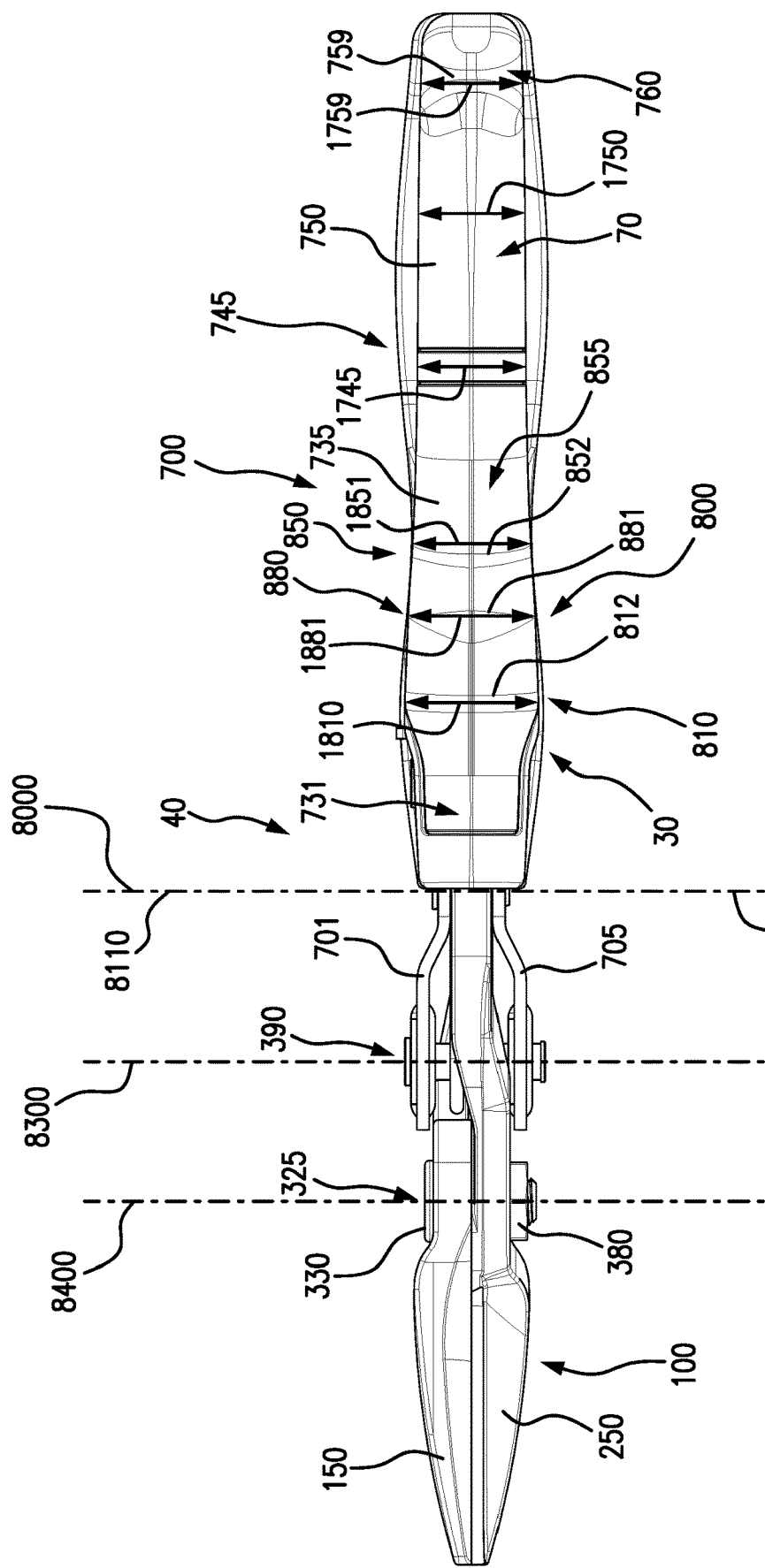
FIG. 6 shows a finger-side view of the metal snips.

FIG. 6 shows a finger-side view of the metal snips of FIG. 1. FIG. 6 shows the handle pivot centerline 8300 and the blade pivot centerline 8400 of the compound hinge. The extended grip plane 8000 is also shown. The extended centerlines distance 8410 can be in a range of 10 mm to 50 mm, e.g. 23.1 mm.

A forward finger flange width 1810 can be in a range of 5 mm to 50 mm, e.g. 21.8 mm. A finger trough low point width 1881 can be in a range of 5 mm to 50 mm, e.g. 20.5 mm. A tail finger flange width 1851 can be in a range of 5 mm to 50 mm, e.g. 19.4 mm. A finger grip narrow width 1745 can be in a range of 5 mm to 50 mm, e.g. 17.8 mm. A finger grip width 1750 can be in a range of 5 mm to 50 mm, e.g. 17.4 mm. A pinky grip width 1759 can be in a range of 5 mm to 50 mm, e.g. 16.9 mm.

Figure 7:
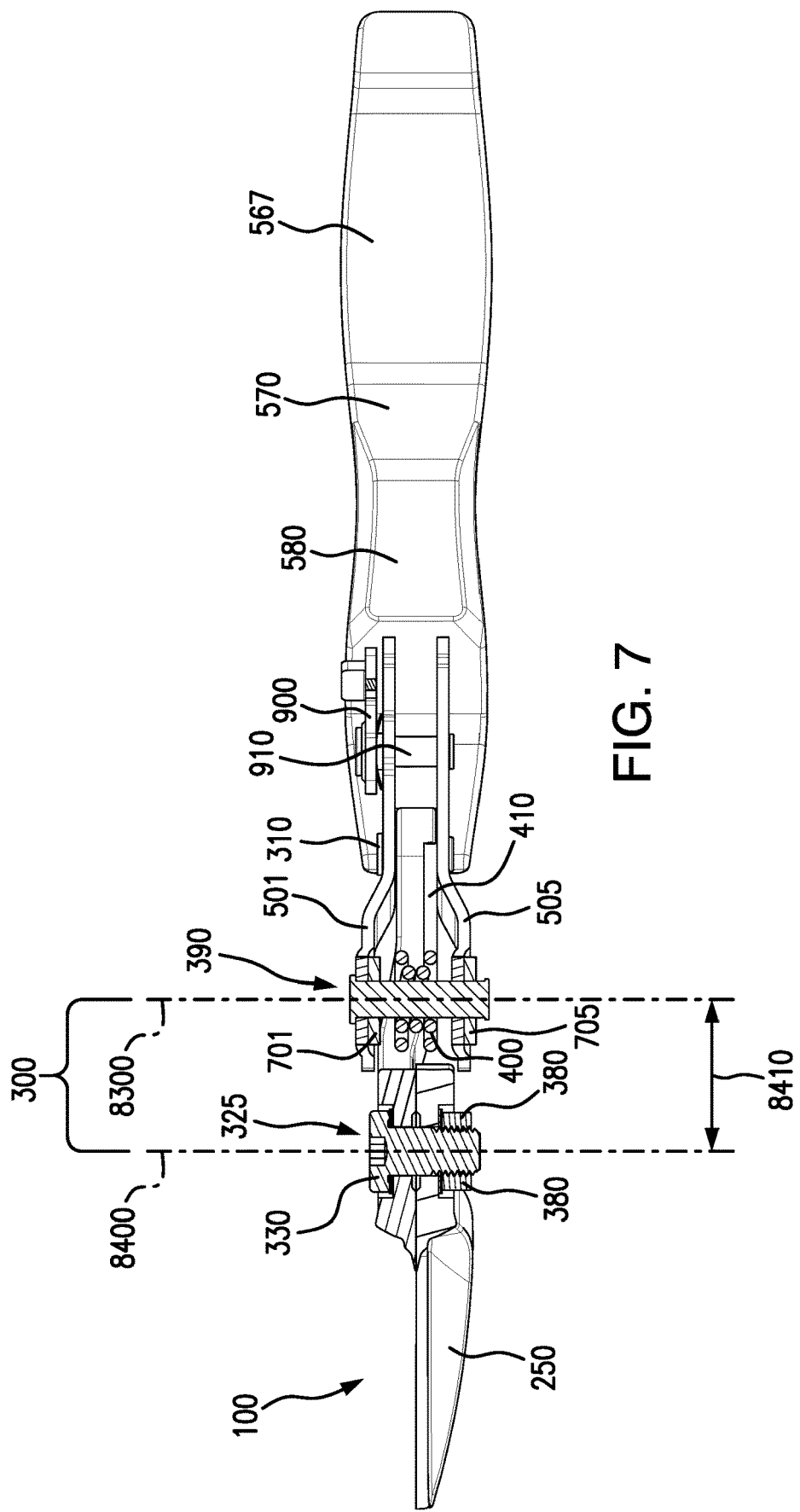
FIG. 7 shows a sectional view of the metal snips of taken through the compound hinge.

FIG. 7 shows a sectional view of the metal snips of FIG. 1 taken through the compound hinge 300. FIG. 7 shows an example configuration of a compound hinge 300 of the blade pivot 325 and handle pivot 390. The spring 400 is also shown.

Figure 8A:
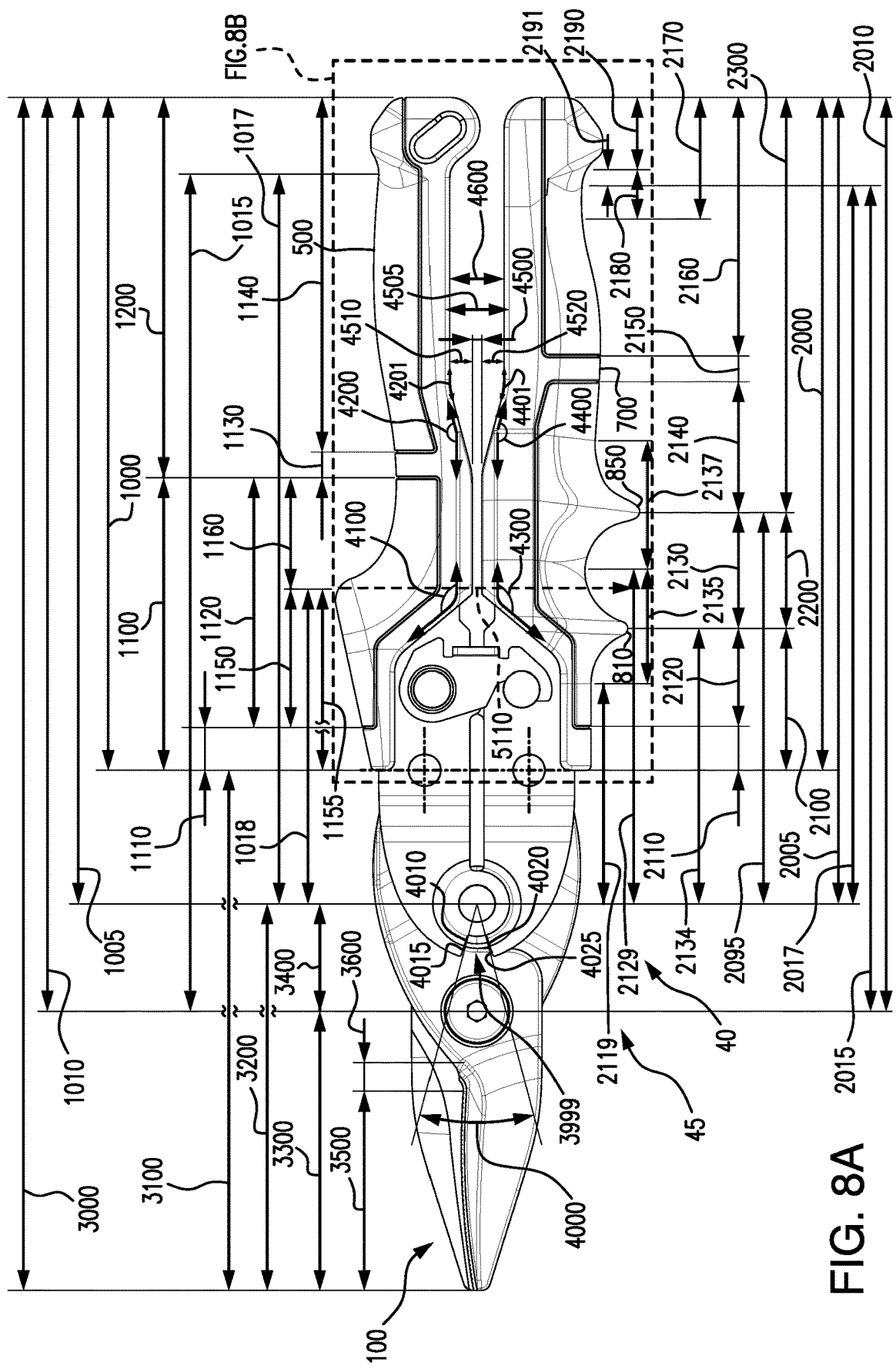
FIG. 8A is a dimension drawing of the metal snips.

FIG. 8A is a first dimension drawing of the metal snips of FIG. 1.

A palm handle stop 4010 and a finger handle stop 4020 can be configured to form a span notch angle 4000 (FIG. 8A)

of from 24° to 36°, such as 30° as measured between a palm handle palm handle stop face 4015 and a finger handle stop face 4025.

The non-limiting example of FIG. 8A, shows a dimensioned embodiment of the metal snips 1 in which a tool length 3000 can be in a range of 204.96 mm to 307.44 mm, e.g. 256 mm. A blade connection length 3100 can be in a range of 89.36 mm to 134.04 mm, e.g. 112 mm. A nose to handle pivot length 3200 can be in a range of 66.48 mm to 99.72 mm, e.g. 83 mm. A nose to blade pivot length 3300 can be in a range of 48 mm to 72 mm, e.g. 60 mm. A pivot separation length 3400 can be in a range of 18.48 mm to 27.72 mm, e.g. 23 mm. A cutting length 3500 can be in a range of 34.24 mm to 51.36 mm, e.g. 43 mm. A blade transition length 3600 can be in a range of 4.08 mm to 6.12 mm, e.g. 5 mm.

A palm handle plateau front ramp 4100 angle can be in a range of 90° to 170° mm, e.g. 45°. A palm handle plateau tail ramp 4200 angle can be in a range of 90° to 170° mm, e.g. 45°. A plateau gap 4500 can be in a range of 1.6 mm to 2.4 mm, e.g. 2 mm. A handle base distance 4600 can be in a range of 9.36 mm to 14.04 mm, e.g. 12 mm.

The palm handle 500 can have a palm handle plateau front ramp angle 4100 can be in a range of 90° to 175°, e.g. 170°, 165°. The palm handle 500 can have a palm handle plateau tail ramp angle 4200 can be in a range of 90° to 175°, e.g. 170°, 165° The palm handle 500 can have a palm handle plateau base angle 4201 can be in a range of 90° to 175°, e.g. 170°, 165°. The palm handle 500 can have a palm handle plateau height 4510 can be in a range of 2 mm to 30 mm, e.g. 4.9 mm.

The finger handle 700 can have a finger handle plateau front ramp angle 4300 can be in a range of 90° to 175°, e.g. 170°, 165° The finger handle 700 can have a finger handle plateau tail ramp angle 4400 can be in a range of 90° to 170°, e.g. 15°. The finger handle 700 can have a finger handle plateau base angle 4401 can be in a range of 90° to 175°, e.g. 170°, or 165°.

The handle 25 can have a plateau gap 4500 can be in a range of 1 mm to 35 mm, e.g. 2 mm. The handle 25 can have a handle base distance 4600 can be in a range of 9.36 mm to 44.04 mm, e.g. 12 mm, 14 mm.

The finger handle plateau height 4520 can be in a range of 2 mm to 30 mm, e.g. 4.9 mm.

A palm handle overmold length 1000 can be in a range of 115.6 mm to 173.4 mm, e.g. 145 mm. An extended purlicue length 1100 can be in a range of 50.4 mm to 75.6 mm, e.g. 63 mm. A palm grip length 1200 can be in a range of 65.2 mm to 97.8 mm, e.g. 82 mm. An exposed overmold length of extended purlicue grip 1110 can be in a range of 7.2 mm to 10.8 mm, e.g. 9 mm. A purlicue cushion length 1120 can be in a range of 43.2 mm to 64.8 mm, e.g. 54 mm. A palm cushions gap length 1130 can be in a range of 4.16 mm to 6.24 mm, e.g. 5 mm. A palm cushion length 1140 can be in a range of 61.04 mm to 91.56 mm, e.g. 76 mm. An extended purlicue cushion length 1150 can be in a range of 5 mm to 50 mm, e.g. 26 mm. An extended palm grip length 1155 can be in a range of 21.2 mm to 31.8 mm, e.g. 27 mm. A purlicue cushion tail length 1160 can be in a range of 22 mm to 33 mm, e.g. 28 mm.

A palm handle blade pivot length 1010 can be in a range of 156.96 mm to 235.44 mm, e.g. 196 mm. A palm handle pivot length 1005 can be in a range of 138.48 mm to 207.72 mm, e.g. 173 mm. A palm handle blade pivot lever length 1015 can be in a range of 147.12 mm to 220.68 mm, e.g. 184 mm. A palm handle pivot lever length 1017 can be in a range of 128.64 mm to 192.96 mm, e.g. 161 mm. A blade pivot to purlicue peak length 1018 can be in a range of 43.2 mm to 150.00 mm, e.g. 65 mm.

A finger handle overmold length 2000 can be in a range of 115.6 mm to 173.4 mm, e.g. 145 mm. An extended finger grip length 2100 can be in a range of 23.2 mm to 34.8 mm, e.g. 29 mm. A finger set length (width) 2200 can be in a range of 20.72 mm to 31.08 mm, e.g. 26 mm. A finger grip length 2300 can be in a range of 71.68 mm to 107.52 mm, e.g. 90 mm. An exposed overmold length of extended finger grip length 2110 can be in a range of 7.2 mm to 10.8 mm, e.g. 9 mm. An extended finger flange cushion length 2120 can be in a range of 16 mm to 24 mm, e.g. 20 mm. A finger set width 2130 can be in a range of 17.6 mm to 35 mm, e.g. 26 mm. A forward finger flange width 2135 can be in a range of 19.8 mm to 29.7 mm, e.g. 25 mm. A tail finger flange width 2137 can be in a range of 22 mm to 33 mm, e.g. 28 mm. A finger flange tail cushion length 2140 can be in a range of 22.72 mm to 34.08 mm, e.g. 28 mm. A finger cushions gap length 2150 can be in a range of 4.16 mm to 6.24 mm, e.g. 5 mm. A tail finger cushion length 2160 can be in a range of 44.8 mm to 67.2 mm, e.g. 56 mm. A pinky end length 2170 can be in a range of 18.24 mm to 27.36 mm, e.g. 23 mm. A pinky grip width 2180 can be in a range of 8 mm to 12 mm, e.g. 10 mm. A finger end peak length 2190 can be in a range of 10.24 mm to 15.36 mm, e.g. 13 mm. A pinky dip trough distance 2191 can be in a range of 3.2 mm to 4.8 mm, e.g. 4 mm.

A finger handle blade pivot length 2010 can be in a range of 156.96 mm to 235.44 Mm, e.g. 196 mm. A finger handle pivot length 2005 can be in a range of 138.48 mm to 207.72 mm, e.g. 173 mm. A finger handle blade pivot lever length 2015 can be in a range of 147.12 mm to 220.68 mm, e.g. 184 mm. A finger handle pivot lever length 2017 can be in a range of 128.64 mm to 192.96 mm, e.g. 161 mm.

A finger handle pivot to forward finger flange base 2119 can be in a range of 25 mm to 110 mm, e.g. 40 mm. A finger handle pivot to finger set trough 2129 can be in a range of 25 mm to 130 mm, e.g. 70 mm. A finger handle pivot to forward finger flange peak 2134 can be in a range of 25 mm to 110 mm, e.g. 40 mm. A finger handle pivot to tail finger flange peak 2095 can be in a range of 25 mm 130 to mm, e.g. 83 mm.

Figure 8B:
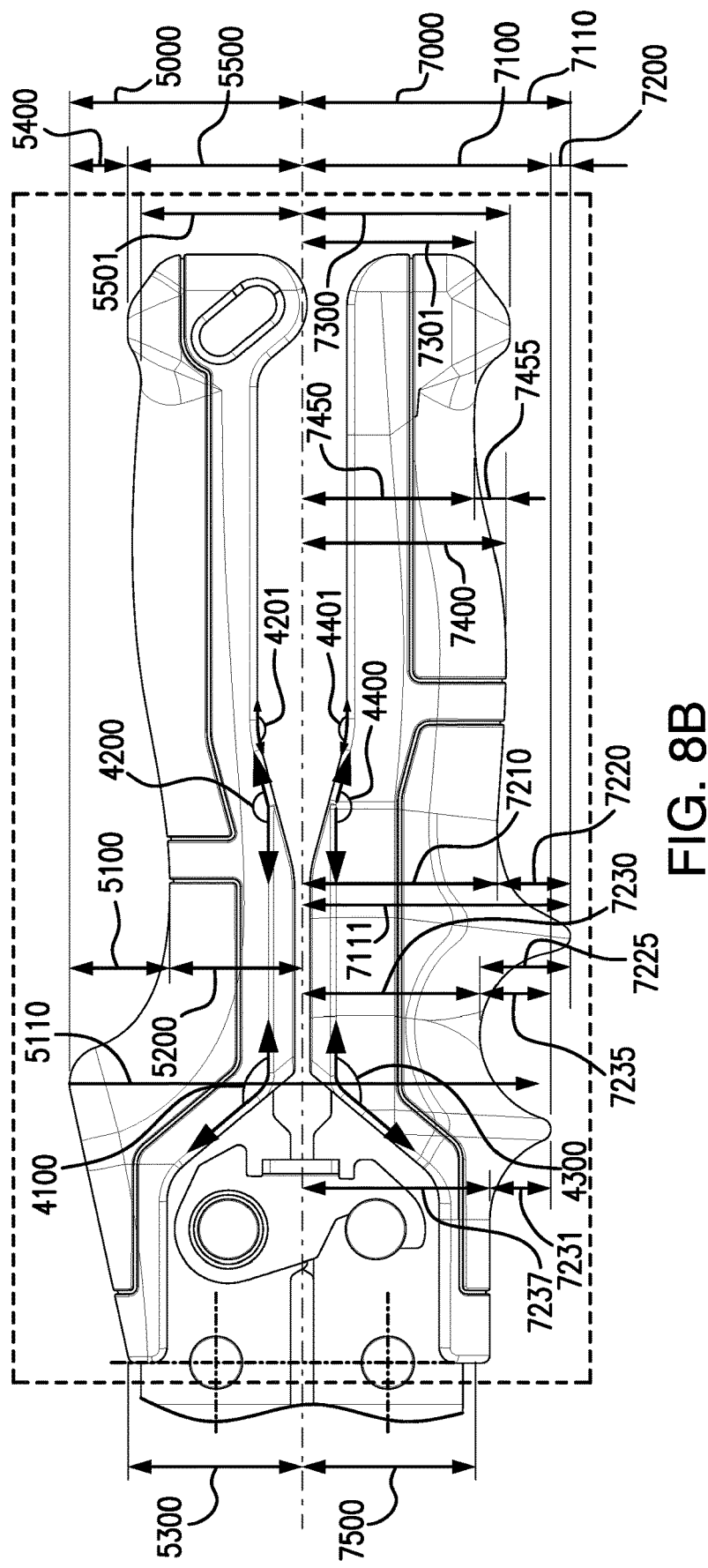
FIG. 8B is a detailed dimension drawing of the handle of the metal snips.

FIG. 8B is a first dimension drawing of the handle of the metal snips of FIG. 1. In the embodiment shown in FIG. 8B, a palm handle height 5000 can be in a range of 24.56 mm to 36.84 mm, e.g. 31 mm. A purlicue peak height 5100 can be in a range of 10.8 mm to 16.2 mm, e.g. 14 mm. A purlicue base height 5200 can be in a range of 13.76 mm to 20.64 mm, e.g. 17 mm. An extended palm handle grip height 5300 can be in a range of 18.16 mm to 27.24 mm, e.g. 23 mm. A purlicue peak tail clearance 5400 can be in a range of 6.48 mm to 9.72 mm, e.g. 8 mm. A palm handle tail height 5500 can be in a range of 18.08 mm to 27.12 mm, e.g. 23 mm.

In an embodiment, the finger handle height 7000 can be in a range of 28 mm to 52 mm, e.g. 35 mm, 42 mm. The forward finger flange height 7100 can be in a range of 25.6 mm to 38.4 mm, e.g. 32 mm. The forward finger flange reduction 7200 can be in a range of 2.4 mm to 3.6 mm, e.g. 3 mm.

The tail finger flange base height 7210 can be in a range of 20.32 mm to 30.48 mm, e.g. 25 mm. The tail finger flange peak height 7220 can be in a range of 7.68 mm to 11.52 mm, e.g. 10 mm. A tail finger flange peak to trough height 7225 can be in a range of 9.28 mm to 13.92 mm, e.g. 12 mm. The tail finger flange height 7111 can be the same or different as the finger handle height 7110.

A forward finger flange peak to trough height 7235 can be in a range of 9.28 mm to 13.92 mm, e.g. 12 mm. A trough base height 7230 can be in a range of 18.72 mm to 28.08 mm, e.g. 23 mm.

An extended finger grip base height 7237 can be in a range of 19.6 mm to 29.4 mm, e.g. 25 mm. An extended palm handle grip height 7500 can be in a range of 17.76 mm to 26.64 mm, e.g. 22 mm.

In an embodiment, the finger flange height can be equal to or greater than the finger flange width. In an embodiment, the finger flange height can be equal to or greater than a portion the finger flange width. For example, the forward finger flange peak to trough height 7235 can be equal to or greater than the forward finger flange width 2135. In another example, the tail finger flange peak to trough height 7225 can be equal to or greater than the tail finger flange width 2137. In another aspect, the forward finger flange peak height 7231 can be equal to or greater than the forward finger flange width 2135. The forward finger flange peak height 7231 can be in a range of 7.68 mm to 11.52 mm, e.g. 10 mm. Tail finger flange peak height 7220 can be equal to or greater than the tail finger flange width 2137. The tail finger flange peak height 7220 can be the same or different from the forward finger flange peak height 7231.

Optionally, the forward finger flange 810 can have one or more concave portions proximate to the forward finger flange peak 812. For example the forward finger flange 810 can have a concave portion proximate to the extended finger grip 731, or can have a concave portion located between the extended finger grip 731 and the forward finger flange peak 812. In another aspect, the forward finger flange 810 can have a concave portion proximate to forward finger flange peak 812 and forming a portion of the finger set 800, or can have a concave portion located between forward finger flange peak 812 and the finger trough 880 and/or finger trough low point 881. The forward finger flange 810 can have a first side having a concave portion and can have a second side having a concave portion. Optionally, the extended finger grip 731 can have a portion with a concave shape.

The tail finger flange 850 can also have one or more concave portions proximate to the tail finger flange peak 852. For example the tail finger flange 850 can have a concave portion proximate to the finger set grip 735 and/or finger grip 745, or can have a concave portion located between the tail finger flange peak 852 and the finger trough 880 and/or finger trough low point 881. The tail finger flange 850 can have a first side having a concave portion and can have a second side having a concave portion.

In an embodiment, the finger set 800 can be concave in shape and/or have one or more concave portions. The finger set 800 can have a concave portion located at position along the finger handle overmold length 2000 and/or finger handle length between a forward finger flange peak 812 and the tail finger flange peak 852.

A finger handle tail height 7300 can be in a range of 21.6 mm to 32.4 mm, e.g. 27 mm. A tail finger cushion peak height 7400 can be in a range of 21.2 mm to 31.8 mm, e.g. 27 mm. A tail finger cushion trough height 7450 can be in a range of 18.08 mm to 27.12 mm, e.g. 23 mm. A tail finger cushion rise height 7455 can be in a range of 1 mm to 15 mm, e.g. 4 mm.

Figure 8C:
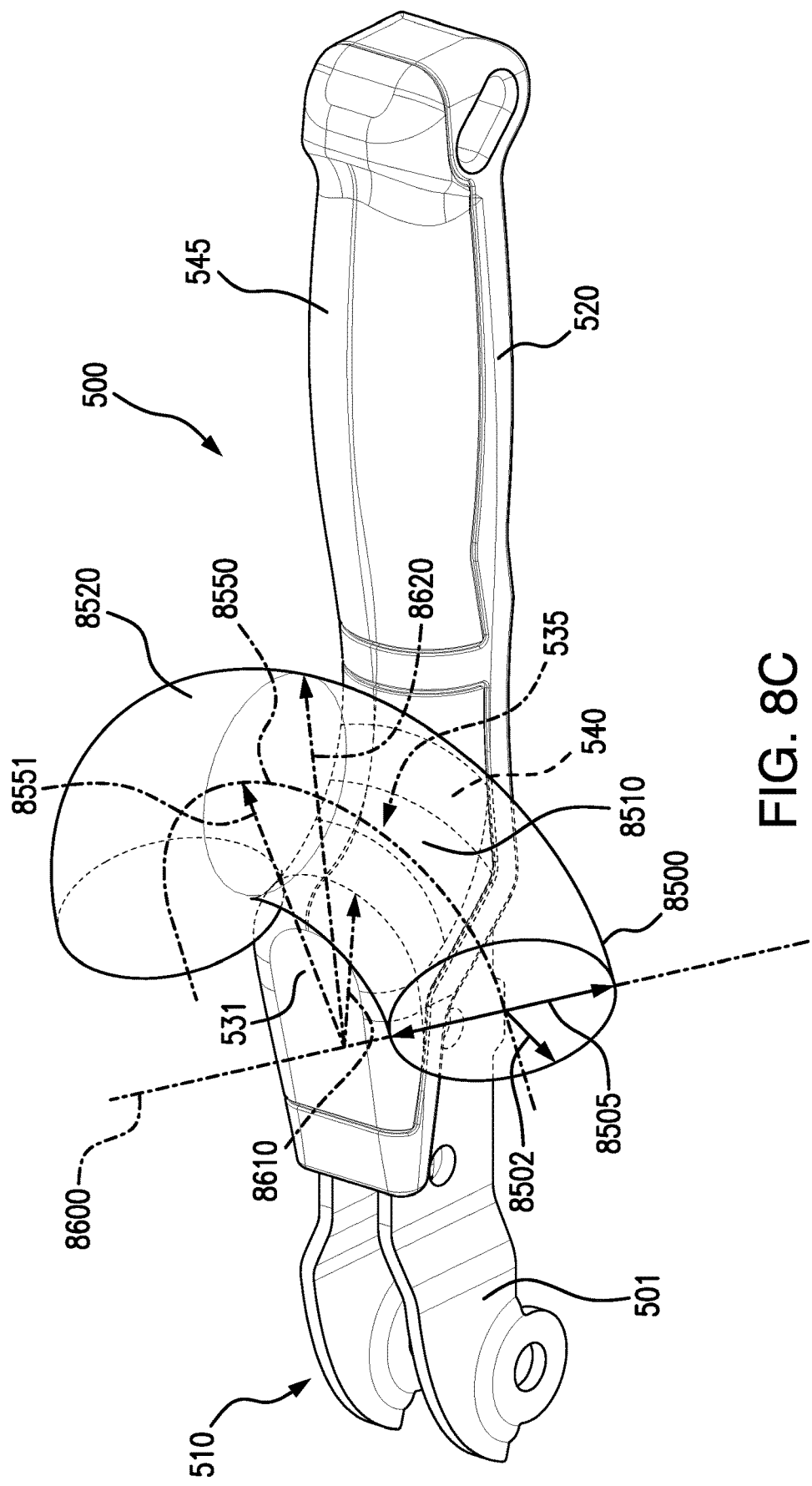
FIG. 8C shows an embodiment of a torus surface of the purlicue grip.

FIG. 8C shows the torus surface 8510 of the purlicue grip 535. As shown in FIG. 8C, the torus surface 8510 of the purlicue grip 535 conforms to the outer torus surface 8520. In the nonlimiting example embodiment of FIG. 8C, a torus 8500 can be formed about a torus axis 8600. FIG. 8C shows the torus 8500 can have a revolution having a torus inner radius of revolution 8610 and a torus outer radius of revolution 8620 which can originate from the torus axis 8600. The torus 8500 can also have a torus centerline radius 8551 defining a torus centerline 8550. The cross-section of torus 8500 in FIG. 8C shows a purlicue torus radius 8502 and a torus diameter 8620 which can intersect the torus centerline 8550.

Figure 9:
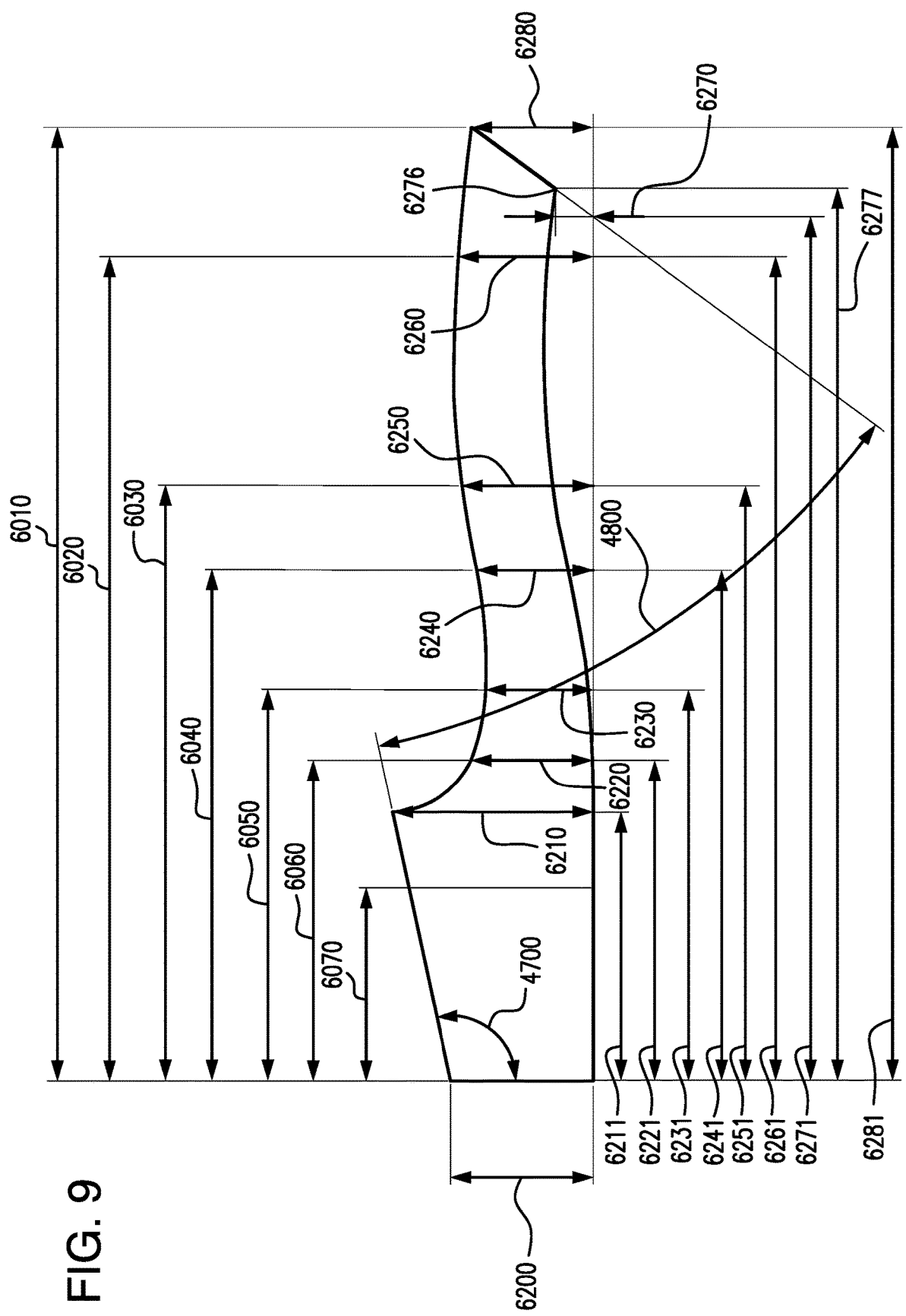
FIG. 9 is a detailed dimension drawing of an embodiment of a palm handle configuration.

The torus inner radius of revolution 8610 can be in a range of from 10 mm to 50 mm, e.g. 23 mm, or 30 mm. The torus centerline radius 8551 can be in a range of from 25 mm to 50 mm, e.g. 40.5 mm. The torus outer radius of revolution 8620 can be in a range of from 35 mm to 70 mm, e.g. 58 mm. The purlicue torus radius 8502 can be in a range of from 10 mm to 50 mm, e.g. 17.5 mm. The purlicue torus diameter 8505 can be in a range of from 20 mm to 100 mm, e.g. 35 mm FIG. 9 is a detailed dimension drawing of an embodiment of a palm handle. In the non-limiting example embodiment of FIG. 9, a front grip height 6200 can be in a range of 17 mm to 25.4 mm, e.g. 21 mm.

A $1^{st}$ grip length 6010 can be in a range of 114 mm to 171 mm, e.g. 142 mm. A $2^{nd}$ grip length 6020 can be in a range of 97.9 mm to 147 mm, e.g. 122 mm. A $3^{rd}$ grip length 6030 can be in a range of 70.8 mm to 106 mm, e.g. 88 mm. A $4^{th}$ grip length 6040 can be in a range of 60.6 mm to 90.9 mm, e.g. 76 mm. A $5^{th}$ grip length 6050 can be in a range of 46.8 mm to 71.2 mm, e.g. 58 mm. A $6^{th}$ grip length 6060 can be in a range of 38.28 mm to 57.42 mm, e.g. 48 mm. A $7^{th}$ grip length 6070 can be in a range of 23.12 mm to 34.68 mm, e.g. 29 mm.

A $1^{st}$ grip height 6210 can be in a range of 24 mm to 36 mm, e.g. 30 mm, at a $1^{st}$ distance 6211. A $2^{nd}$ grip height 6220 can be in a range of 14.4 mm to 21.6 mm, e.g. 18 mm, at a second distance 6221. A $3^{rd}$ grip height 6230 can be in a range of 12.8 mm to 19.2 mm, e.g. 16 mm, at a $3^{rd}$ distance 6231. A $4^{th}$ grip height 6240 can be in a range of 13.8 mm to 20.8 mm, e.g. 17 mm, at a $4^{th}$ distance 6241. A $5^{th}$ grip height 6250 can be in a range of 15.6 mm to 23.4 mm, e.g. 20 mm, at a $5^{th}$ distance 6251. A $6^{th}$ grip height 6260 can be in a range of 16 mm to 24 mm, e.g. 20 mm, at a $6^{th}$ distance 6261.

An inner grip height 6270 can be in a range of 4.6 mm to 6.8 mm, e.g. 6 mm, at a $7^{th}$ distance 6271. An outer grip height 6280 can be in a range of 21.6 mm to 32.4 mm, e.g. 27 mm, at an $8^{th}$ distance 6281.

A blade pivot angle 4700 can be in a range of 45° to 72°, e.g. 60°. A handle pivot angle 4800 can be in a range of 65° to 84°, e.g. 80°.

FIG. 10A is a finger-side view of an operator gripping the metal snips of FIG. 1. FIG. 10A further shows a hand 50 of an operator, having a thumb 51, with purlicue 999 and palm 998 gripping the palm handle 500 with the purlicue 999 comfortably nested in the purlicue grip 535 and gripping the palm handle 500.

The hand 50 respectively has an index finger 52 (a.k.a. pointer finger), a middle finger 53, a ring finger 54 and a pinky finger 55 (a.k.a. little finger). FIG. 10A show the hand gripping the handle 25 such that the index finger 52 is positioned in the finger set 800 and the pinky finger 55 is positioned in the pinky grip 760 in the pinky dip 759.

FIG. 10B is a different perspective view of an operator gripping the metal snips as shown in the FIG. 10A. FIG. 10B shows how the purlicue 999 of the operator's hand ergonomically is positioned nesting in and gripping the purlicue grip 535. FIG. 10 also shows how the index finger 52 nests in and grips the finger set 800.

FIG. 10C shows an alternate grip for an operator which can be achieved with the handle 25. As shown in FIG. 10C, the hand 50 having a thumb 51, with purlicue 999 and palm 998 is shown gripping the palm handle 500 with the purlicue 999 comfortably nested in the purlicue grip 535 and gripping the palm handle 500. In this alternate grip, the index finger 52 is upon and gripping at least a portion of the extended finger grip 731 and the middle finger 53 is nested in and gripping the finger set 800.

Figure 11A:
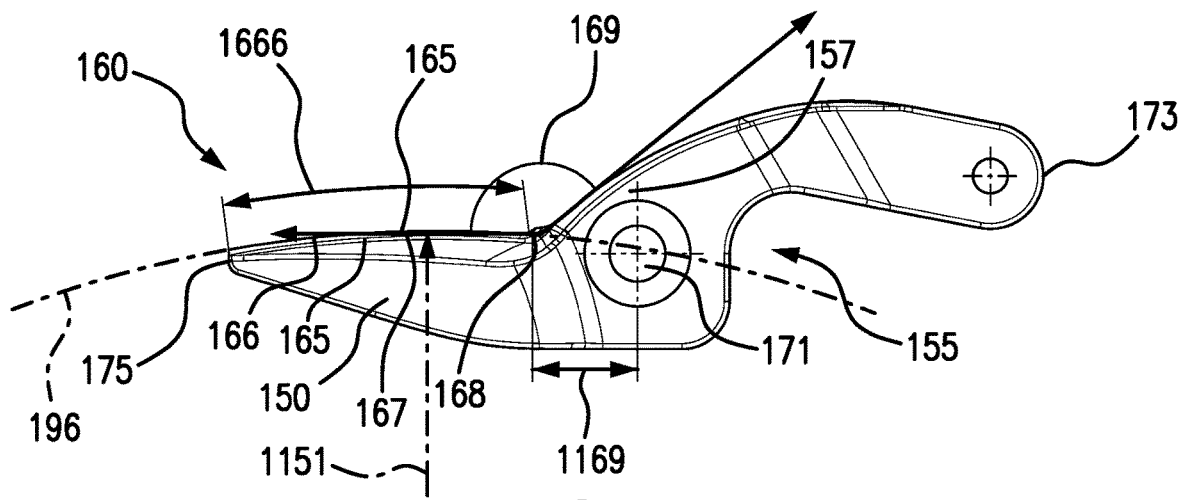
FIG. 11A is a detailed view of the front blade.
Figure 11C:
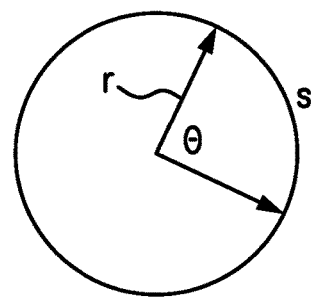
FIG. 11C is a graphical depiction of a relationship between r, θ and s.
Figure 11B:
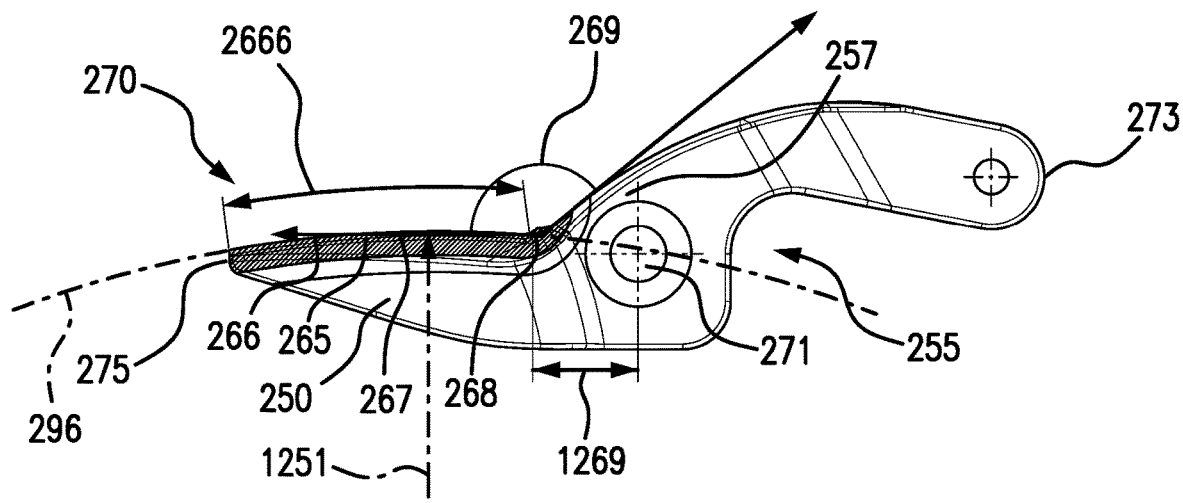
FIG. 11B is a detailed view of the back blade.

FIGS. 11A and 11B respectively show detailed views of the front blade 150 and the rear blade 250. FIG. 11A shows the front blade face 155 having the front blade cutting edge 165. The front blade cutting edge 165 meets the front blade base 157 at a front blade origin angle 169 having a front blade origin 168. In an embodiment, the front blade origin angle 169 can be in a range of 90° to 175°, such as 140. The front blade cutting edge shape 167 can extend from the front blade origin 168 to the front blade nose end 175. In an embodiment, the front blade cutting edge shape 167, which can have the shape of a cutting edge arc 196, such as the front blade cutting arc length 1666, can be described by Equation 1:

$$s = r \times \theta, \quad \text{Equation 1:}$$

wherein, as shown in FIG. 11C, s=cutting edge arc length, e.g. the front blade cutting arc length 1666, r=radius, and θ=cutting arc angle. In an embodiment, "r" can be in a range of 150 mm to 250 mm, e.g. 175 mm. and "θ" can be in a range of 5° to 30°, e.g. 15°.

In an embodiment, the front blade origin pivot distance 1169, can be the distance from the front blade origin 168 to the center of the front pivot opening 171.

FIG. 11B shows the back blade face 255 having the back blade cutting edge 265. The back blade cutting edge 265 meets the back blade base 257 at a back blade origin angle 269 having a back blade origin 268. In an embodiment, the back blade origin angle 269 can be in a range of 90° to 175°, such as 140°. The back blade cutting edge shape 267 can extend from the back blade origin 268 to the back blade nose end 275. In an embodiment, the back blade cutting edge shape 267, which can have the shape of a cutting edge arc 296, such as back blade cutting arc length 2666, can be described by Equation 1:

$$s = r \times \theta, \quad \text{Equation 1:}$$

wherein, as shown in FIG. 11C, s=cutting edge arc length, e.g. such as back blade cutting arc length 2666, r=radius, and θ=cutting arc angle. In an embodiment, "r" can be in a range of 150 mm to 250 mm, e.g. 175 mm. and "θ" can be in a range of 5° to 30°, e.g. 15°.

In an embodiment, the back blade origin pivot distance 1269, can be the distance from the back blade origin 268 to the center of the back pivot opening 271.

FIG. 12A is a detailed view of the geometry of the compound hinge 300, purlicue grip 535 and finger set 800. The handle 25 can have the handle pivot angle 4800 which can be in a range of 65° to 84°, e.g. 80°. The handle 25 can have a purlicue handle pivot angle 4900 which can be in a range of 36° to 54°, e.g. 45°. The handle 25 can have a purlicue blade pivot angle 4950 which can be in a range of 44° to 66°, e.g. 55°. The handle 25 can have a finger set handle pivot angle 4910 which can be in a range of 44° to 66°, e.g. 55°. The handle 25 can have a finger set blade pivot angle 4920 which can be in a range of 52° to 78°, e.g. 65°. The handle 25 can have The handle 25 can have a span angle 4990 which can be in a range of 15° to 90°, e.g. 30°, or 60°. The handle 25 can have a grip span angle 4991 which can be in a range of 15° to 90°, e.g. 30°, or 60°. The handle 25 can have a handle centerline span angle 4992 which can be in a range of 15° to 90°, e.g. 30°, or 60°. The purlicue grip 535 can have a purlicue curve diameter 4902 which can be in a range of 15 mm to 70 mm, e.g. 28 mm. The purlicue grip 535 can have a purlicue curve radius 4905 which can be in a range of 7.5 mm to 35 mm, e.g. 14 mm. The forward finger flange 810 can have an extended finger flange diameter 4922 which can be in a range of 12 mm to 40 mm, e.g. 23 mm. The forward finger flange 810 can have an extended finger flange radius 4925 which can be in a range of 6 mm to 20 mm, e.g. 11 mm. The finger set 800 can have a finger set diameter 4912 which can be in a range of 12 mm to 50 mm, e.g. 23 mm. The finger set 800 can have a finger set radius 4915 which can be in a range of 6 mm to 30 mm, e.g. 11 mm, or 22.5 mm. The tail finger flange 850 a tail finger flange diameter 4917 which can be in a range of 12 mm to 80 mm, e.g. 23 mm. The tail finger flange 850 a tail finger flange radius 4919 which can be in a range of 6 mm to 40 mm, e.g. 11 mm, or 11.25 mm.

Figure 12B:
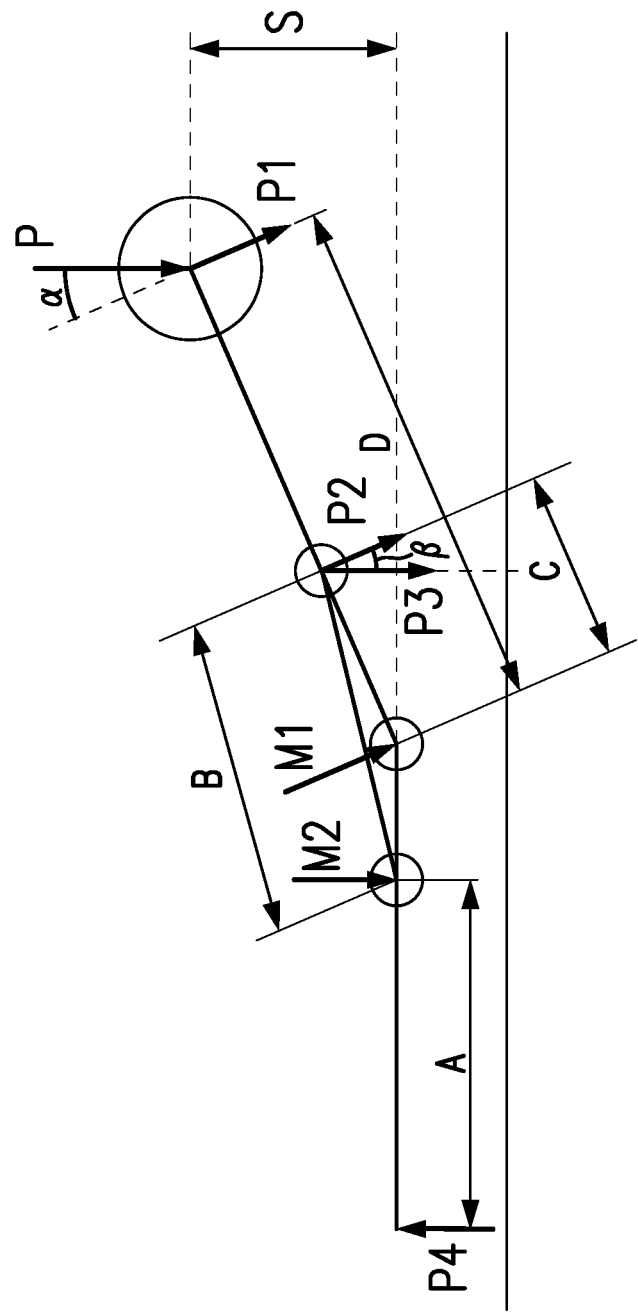
FIG. 12B is a force vector diagram of arm and force movements using the hand tool.

FIG. 12B is a force vector diagram of arm and force movements using the metal snips 1. As shown in FIG. 12B, the identified variables have the following relationships: P is applied force on the handle. P1 is the transferred force according to the M1 momentum pivot. P2 force is calculated according to the M1 momentum point and transferred as P3 according to the M2 momentum pivot. P4 is the shear force transferred the blades according to the M2 momentum pivot. Leverage Ratio is the ratio of P4 shear force relative to the applied P force on the handle by the user. This arm and force movements happen on both sides of the handle and simplified to explain relations on one side only.

$$P1 = P * \cos \alpha \quad \text{Equation A1:}$$

$$M1 = P1 * D \quad \text{Equation A2:}$$

$$P2 = M1/C \quad \text{Equation A3:}$$

$$P3 = P2 * \cos \beta \quad \text{Equation A4:}$$

$$P4 = M2/A \quad \text{Equation A5:}$$

$$\text{Leverage Ratio} = P4/P \quad \text{Equation A6:}$$

At 30° span angle 4990 as shown in drawing 12A, the disclosed nonlimiting example embodiment achieves a value of Leverage Ratio in a range of 1 to 20, e.g. 10.25 and a value of D, which can be the pivot to thumb/index finger, in a range of 50 mm to 250 mm, e.g. 88.5 mm/80.35 mm.

FIG. 12B shows a palm handle lever height S which is also shown on FIG. 8B as the palm handle lever height 5501. The palm handle lever height 5501 can be in a range of can be in a range of 24.56 mm to 36.84 mm, e.g. 31 mm. The palm handle lever height 5501 can be the same or different from the finger handle lever height 7301 which can be in a range of can be in a range of 24.56 mm to 36.84 mm, e.g. 31 mm.

For example, where A=60 mm, B=52.94 mm and C=30.75 mm, then D can be 88.5 mm (for palm side)/80.35 mm (for finger side) and Leverage ratio can be 10.25 kgf for applied 1 kgf which is P. In an embodiment, the handle 25 can have a leverage ratio such that a gripping force in a range of 0.5 kgf to 20 kgf applied to the palm handle 500 and finger handle 700 results in a cutting force of 50 kgf to 205 kgf.

In an embodiment, 1 kgf of gripping force applied to the palm handle 500 and finger handle 700 results in 10.25 kgf of cutting force results imparted to a workpiece by the front blade cutting edge 165 and back blade cutting edge 265.

In an embodiment, the handle 25 can have a span angle 4990 in a range of 15° to 30° can generate a leverage ratio in a range of 1.0 to 20.0, or 9.9 to 2.0, e.g. 9.9, 10, 10.25, 11, 12 or 15. In an embodiment, the handle 25 can have a leverage ratio in a range of 9.9 to 20 can have span angle 4990 in a range of 10° to 60°, or 15° to 30°, e.g. 25°, 30°, 35°, or 40°.

This disclosure regards a hand tool and its many aspects, features and elements. Such an apparatus can be dynamic in its use and operation. This disclosure is intended to encompass the equivalents, means, systems and methods of the use of the metal snips and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above described embodiments of the hand tool as disclosed herein without departing from the spirit and the scope of the claims.

We claim:

1. A handle for a metal snips hand tool, comprising:
    a palm handle for the metal snips hand tool pivotally connected to a finger handle;
    said palm handle adapted to pivotally connect to at least a first portion of a nosepiece of the hand tool;
    said palm handle having an extended palm grip purlicue width that is greater than a palm handle narrow width;
    said palm handle having a purlicue base having a purlicue base height in a range of about 14 mm to about 21 mm;
    said palm handle having a purlicue curve radius in a range of 7.5 mm to 35 mm;
    said finger handle having an extended finger grip configured to receive a grip of an index finger of an operator and a finger set having a finger trough configured to receive a grip of a middle finger of an operator, said finger trough configured between a forward finger flange and a tail finger flange;
    said forward finger flange having a concave portion between the extended finger grip and a forward finger flange peak, such that the forward finger flange extends between the index finger and the middle finger of the operator when the grip of the middle finger of the operator is received in the finger trough;
    said finger trough having a trough base height in a range of about 19 mm to about 28 mm;
    said finger handle adapted to pivotally connect to at least a second portion of said nosepiece; and
    said handle having closed state and an open state.

2. The handle for a metal snips hand tool according to claim 1, wherein said tail finger flange has a tail finger flange peak, and said forward finger flange peak is configured at a finger set width from said tail finger flange peak.

3. The handle for a metal snips hand tool according to claim 1, wherein said forward finger flange has a forward finger flange height and said tail finger flange has a tail finger flange height different from said forward finger flange height.

4. The handle for a metal snips hand tool according to claim 1, wherein said forward finger flange has a forward finger flange height and said tail finger flange has a tail finger flange height which is the same as said forward finger flange height.

5. The handle for a metal snips hand tool according to claim 1, further comprising:
    a purlicue grip having a purlicue peak, wherein said finger set is configured such that the purlicue peak has a purlicue peak projection between said forward finger flange and said tail finger flange when the handle is in a closed state and when said handle is in an open state.

6. The handle for a metal snips hand tool according to claim 1, wherein the extended finger grip, the forward finger flange, and the tail finger flange are overmolded over a finger handle frame.

7. The handle for a metal snips hand tool according to claim 1, wherein the nosepiece has a front blade portion pivotally connected to a back blade portion by a blade pivot, and
    wherein the blade pivot passes through at least a relief washer opening and an adjacent blade washer opening.

8. The handle for a metal snips hand tool according to claim 1, wherein the nosepiece has a first cutting member having said first portion pivotally connected to said palm handle, and
    wherein the nosepiece has a second cutting member having said second portion pivotally connected to said finger handle.

9. The handle for a metal snips hand tool according to claim 1, wherein said purlicue base height is in a range of 13.76 mm to 20.64 mm.

10. The handle for a metal snips hand tool according to claim 1, wherein said trough base height is in a range of 18.72 mm to 28.08 mm.

11. The handle for a metal snips hand tool according to claim 1, wherein said extended finger grip has an extended finger grip base height in a range of about 20 mm to about 29 mm.

12. The handle for a metal snips hand tool according to claim 1, wherein said palm handle having an extended palm grip purlicue width that is greater than a palm handle narrow width.

13. The handle for a metal snips hand tool according to claim wherein said palm handle having a purlicue curve radius in a range of 7.5 mm to 35 mm.

14. The handle for a metal snips hand tool according to claim 1, wherein said finger handle having a forward finger flange width that is greater than a tail finger flange width.

15. The handle for a metal snips hand tool according to claim 1, wherein said forward finger flange having an extended finger flange radius in a range of 6 mm to 20 mm.

16. The handle for a metal snips hand tool according to claim 1, wherein said extended palm grip purlicue width is in a range of about 10 mm to about 45 mm.

17. The handle for a metal snips hand tool according to claim 1, wherein said extended palm grip purlicue width is in a range of about 10 mm to about 45 mm and the palm grip has a palm grip width reduction in a range of about 1 mm to about 40 mm.

18. The handle for a metal snips hand tool according to claim 1, wherein said palm handle further comprises a partial torus surface.

19. The handle for a metal snips hand tool according to claim 1, wherein said purlicue curve radius is about 14 mm.

20. The handle for a metal snips hand tool according to claim 1, wherein said extended finger flange radius is in a range of about 12 mm to about 40 mm.

21. The handle for a metal snips hand tool according to claim further comprising an extended finger flange diameter in a range of 12 mm to 40 mm.

22. A handle for a metal snips hand tool, comprising:
a palm handle for the metal snips hand tool pivotally connected to a finger handle;
said palm handle adapted to pivotally connect to at least a first portion of a nosepiece of the hand tool;
said finger handle having an extended finger grip configured to receive a grip of an index finger of an operator and a finger set having a finger trough configured to receive a grip of a middle finger of an operator, said finger trough configured between a forward finger flange and a tail finger flange;
said finger handle having a forward finger flange width that is greater than a finger flange width;
said extended finger grip having an extended finger grip base height in a range of about 20 mm to about 29 mm;
said forward finger flange having an extended finger flange radius in a range of 6 mm to 20 mm;
said forward finger flange having a concave portion between the extended finger grip and a forward finger flange peak, such that the forward finger flange extends between the index finger and the middle finger of the operator when the grip of the middle finger of the operator is received in the finger trough;
said finger handle adapted to pivotally connect to at least a second portion of said nosepiece; and
said handle having closed state and an open state.

23. The handle for a metal snips hand tool according to claim 22, wherein said purlicue base height is in a range of 13.76 mm to 20.64 mm.

24. The handle for a metal snips hand tool according to claim 22, wherein said extended finger grip base height is in a range of 19.6 mm to 29.4 mm.

25. The handle for a metal snips hand tool according to claim 22, wherein said finger trough has a trough base height in a range of about 19 mm to 28 mm.

26. A handle for a hand tool, comprising:
a palm handle pivotally connected to a finger handle;
said palm handle adapted to pivotally connect to at least a first portion of a nosepiece of the hand tool;
said palm handle having a partial torus shape and a purlicue base having a purlicue base height in a range of about 14 mm to about 21 mm;
said finger handle having an extended finger grip configured to receive a grip of an index finger of an operator and a finger set having a finger trough configured to receive a grip of a middle finger of an operator, said finger trough configured between a forward finger flange and a tail finger flange;
said forward finger flange having a concave portion between the extended finger grip and a forward finger flange peak, such that the forward finger flange extends between the index finger and the middle finger of the operator when the grip of the middle finger of the operator is received in the finger trough;
said finger trough having a trough base height in a range of about 19 mm to about 28 mm;
said finger handle adapted to pivotally connect to at least a second portion of said nosepiece; and
said handle having closed state and an open state.

\* \* \* \* \*